US009519328B2

(12) United States Patent
Woodruff

(10) Patent No.: US 9,519,328 B2
(45) Date of Patent: Dec. 13, 2016

(54) TECHNIQUES FOR SELECTIVELY REDUCING POWER LEVELS OF PORTS AND CORE SWITCH LOGIC IN INFINIBAND SWITCHES

(71) Applicant: Intel Corporation, Santa Clara, CA (US)

(72) Inventor: Robert J. Woodruff, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 203 days.

(21) Appl. No.: 14/283,619

(22) Filed: May 21, 2014

(65) Prior Publication Data
US 2015/0338909 A1 Nov. 26, 2015

(51) Int. Cl.
G06F 1/32 (2006.01)

(52) U.S. Cl.
CPC ............ *G06F 1/3209* (2013.01); *G06F 1/325* (2013.01); *G06F 1/3278* (2013.01); *G06F 1/3287* (2013.01)

(58) Field of Classification Search
CPC ........ G06F 1/32; G06F 1/3296; G06F 1/3209; G06F 1/325; G06F 1/3278; G06F 1/3287
USPC ................................................. 713/323, 324
See application file for complete search history.

(56) References Cited

U.S. PATENT DOCUMENTS

| | | | | |
|---|---|---|---|---|
| 8,228,796 B2* | 7/2012 | Ahn | ........................ | H04L 12/12 370/232 |
| 8,671,236 B2* | 3/2014 | Goldenberg | ............ | G06F 13/20 710/305 |
| 8,897,314 B1* | 11/2014 | Krivitski | ................. | H04L 12/12 370/237 |
| 9,223,377 B1* | 12/2015 | Nachum | ................ | G06F 1/3203 |
| 2004/0194087 A1* | 9/2004 | Brock | ................... | G06F 9/505 718/100 |

\* cited by examiner

*Primary Examiner* — Chun Cao
(74) *Attorney, Agent, or Firm* — Law Office of R. Alan Burnett, P.S

(57) ABSTRACT

Methods for performing power management of InfiniBand (IB) switches and apparatus and software configured to implement the methods. Power management datagrams (MADs) are used to inform IB switches that host servers connected to the IB switch's ports are to transition to a reduced-power or offline state or have returned to a normal operating state. A subnet management agent (SMA) on the IB switch receives the power MADs from the host servers and tracks each server's operating state. In response to power down MADs, the SMA coordinates power reduction of the switch's ports and other switch circuitry. For switches with multi-port IB interfaces, a multi-port interface is caused to enter a reduced-power state when all of its ports are connected to host servers that are idle or offline. Additionally, when all of a switch's ports are connected to idle or offline servers the SMA may put the switch's core switch logic into a reduced-power state. Power MADs are also used to inform upstream IB switches when a switch is to transition to a reduced power state or has returned to a normal operating state.

25 Claims, 17 Drawing Sheets

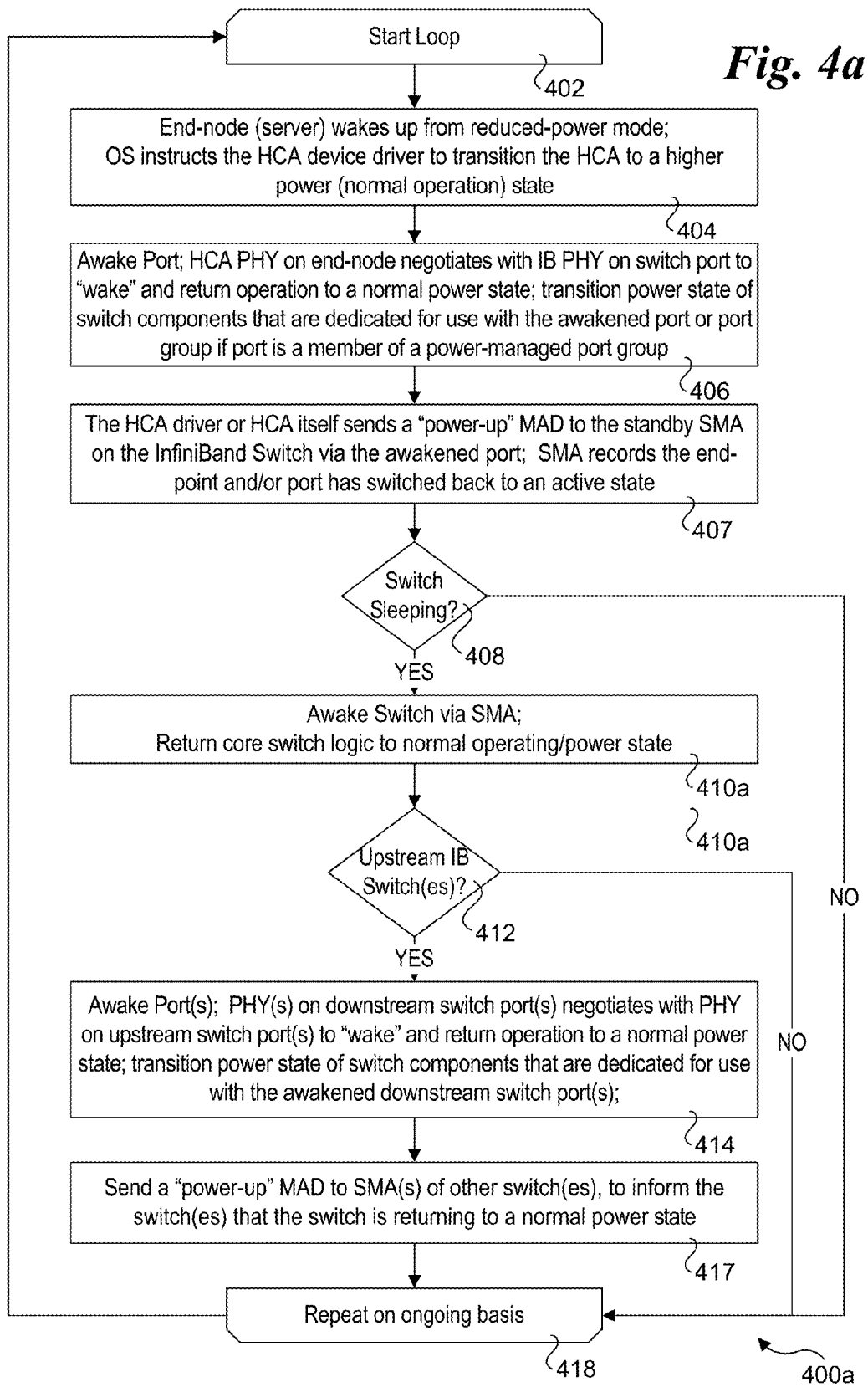

| bytes | bits 31-24 | bits 23-16 | bits 15-8 | bits 7-0 |
|---|---|---|---|---|
| 0 | BaseVersion | MgmtClass | ClassVersion | R | Method |
| 4 | Status | | ClassSpecific | |
| 8 | TransactionID | | | |
| 12 | | | | |
| 16 | AttributeID | | Reserved | |
| 20 | AttributeModifier | | | |
| 24 | Data | | | |
| ... | | | | |
| 252 | | | | |

| bytes | bits 31-24 | bits 23-16 | bits 15-8 | bits 7-0 |
|---|---|---|---|---|
| 0 | Common MAD Header | | | |
| ... | | | | |
| 20 | | | | |
| 24 | Reserved | | | |
| ... | | | | |
| 60 | | | | |
| 64 | Data | | | |
| ... | | | | |
| 252 | | | | |

TECHNIQUES FOR SELECTIVELY
REDUCING POWER LEVELS OF PORTS
AND CORE SWITCH LOGIC IN INFINIBAND
SWITCHES

BACKGROUND INFORMATION

Ever since the introduction of the microprocessor, computer systems have been getting faster and faster. In approximate accordance with Moore's law (based on Intel® Corporation co-founder Gordon Moore's 1965 publication predicting the number of transistors on integrated circuits to double every two years), the speed increase has shot upward at a fairly even rate for nearly three decades. At the same time, the size of both memory and non-volatile storage has also steadily increased, such that many of today's personal computers are more powerful than supercomputers from just 10-15 years ago. In addition, the speed of network communications has likewise seen astronomical increases.

Increases in processor speeds, memory, storage, and network bandwidth technologies have resulted in the build-out and deployment of networks with ever increasing capacities. More recently, the introduction of cloud-based services, such as those provided by Amazon (e.g., Amazon Elastic Compute Cloud (EC2) and Simple Storage Service (S3)) and Microsoft (e.g., Azure and Office 365) has resulted in additional network build-out for public network infrastructure, in addition to the deployment of massive data centers to support these services that employ private network infrastructure.

Cloud-based services are typically facilitated by a large number of interconnected high-speed servers, with host facilities commonly referred to as server "farms" or data centers. These server farms and data centers typically comprise a large-to-massive array of rack and/or blade servers housed in specially-designed facilities. Many of the larger cloud-based services are hosted via multiple data centers that are distributed across a geographical area, or even globally. For example, Microsoft Azure has multiple very large data centers in each of the United States, Europe, and Asia. Amazon employs co-located and separate data centers for hosting its EC2 and AWS services, including over a dozen AWS data centers in the US alone. Typically, data is replicated across geographically disperse data centers to ensure full service availability in case all or a portion of a data center goes down in view of power failure/availability events (e.g., blackouts and brownouts), weather events and other natural disasters, network availability issues (e.g., cutting or otherwise unavailability of high-capacity optical cables), and for other reasons.

Of significant importance are power consumption and cooling considerations. Faster processors generally consume more power, and when such processors are closely packed in high-density server deployments, overall performance is often limited due to cooling requirements. Not only due the processors and other components in the servers consume an incredible amount of power, significant additional power levels are consumed for cooling purposes. As a result, one of the largest operating costs for data centers is power. While much improvement has been made in the form of lower power-consuming silicon, better cooling management, and smart power supplies, hardware vendors are quickly hitting a wall for reducing energy costs.

Another aspect of data centers is scalability. As workloads increase and decrease, servers are bought "on-line" and taken "off-line," wherein an on-line server is available to service work requests while off-line servers are unavailable to service work requests. Rather than shutting off-line servers completely down, these servers are typically put in a reduced power state under which the server processors (the main power consumers) are put into a "sleep" or "sleeping" state (noting that some processors support multiple levels of reduced power states).

In recent years, network adapters and interfaces have been introduced that also support reduced power states, such as some Ethernet adaptors and InfiniBand (IB) Host Channel Adapters (HCAs). However, there are currently no mechanisms for reducing power states in InfiniBand switches, whether by individual port or across an entire IB switch.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 4a is a flowchart comprising an augmented version of the flowchart of FIG. 4 that is implemented for an InfiniBand switch employing multi-port IB interfaces, according to one embodiment;

FIG. 5a-5c show various power-state configurations of the power-managed InfiniBand switch of FIG. 5; wherein FIG. 5a shows a single port in a reduced-power state; FIG. 5b shows all ports and the switch's core logic in a reduced-power state; and FIG. 5c shows two ports and the switch's core logic returning to a normal operation state;

FIG. 6a-6d show various power-state configurations of the power-managed InfiniBand switch of FIG. 6; wherein FIG. 6a shows five ports in a reduced-power state; FIG. 6b shows a multi-port switch in a reduced-power state; FIG. 6c shows all multi-port IB interfaces and the switch's core logic in a reduced-power state while a subnet management agent and power management agent are in standby power states; and FIG. 6d shows two ports and a multi-port switch and the switch's core logic returning to a normal operation state;

DETAILED DESCRIPTION

Figure 1:
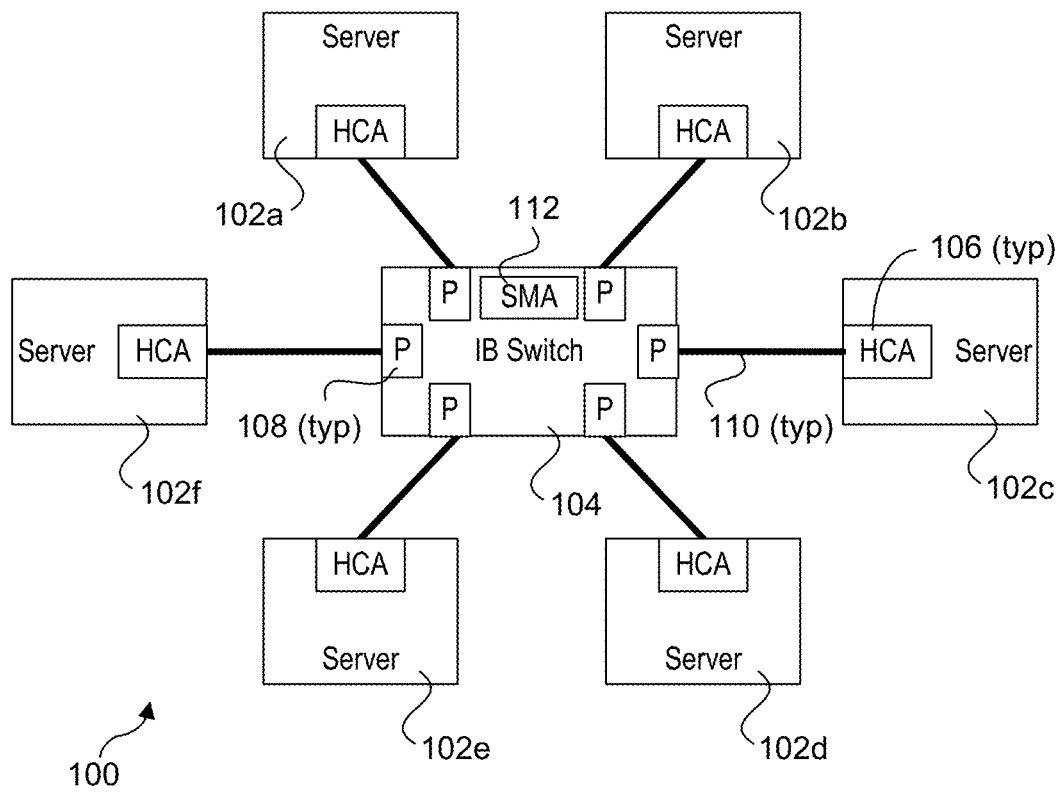
FIG. 1 is a schematic drawing illustrating multiple servers connected to an InfiniBand switch via respective IB HCAs forming a sub-cluster.

Embodiments of methods for performing power management of InfiniBand switches and apparatus and software for implementing the methods are described herein. In the following description, numerous specific details are set forth to provide a thorough understanding of embodiments disclosed and illustrated herein. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Figure 2:
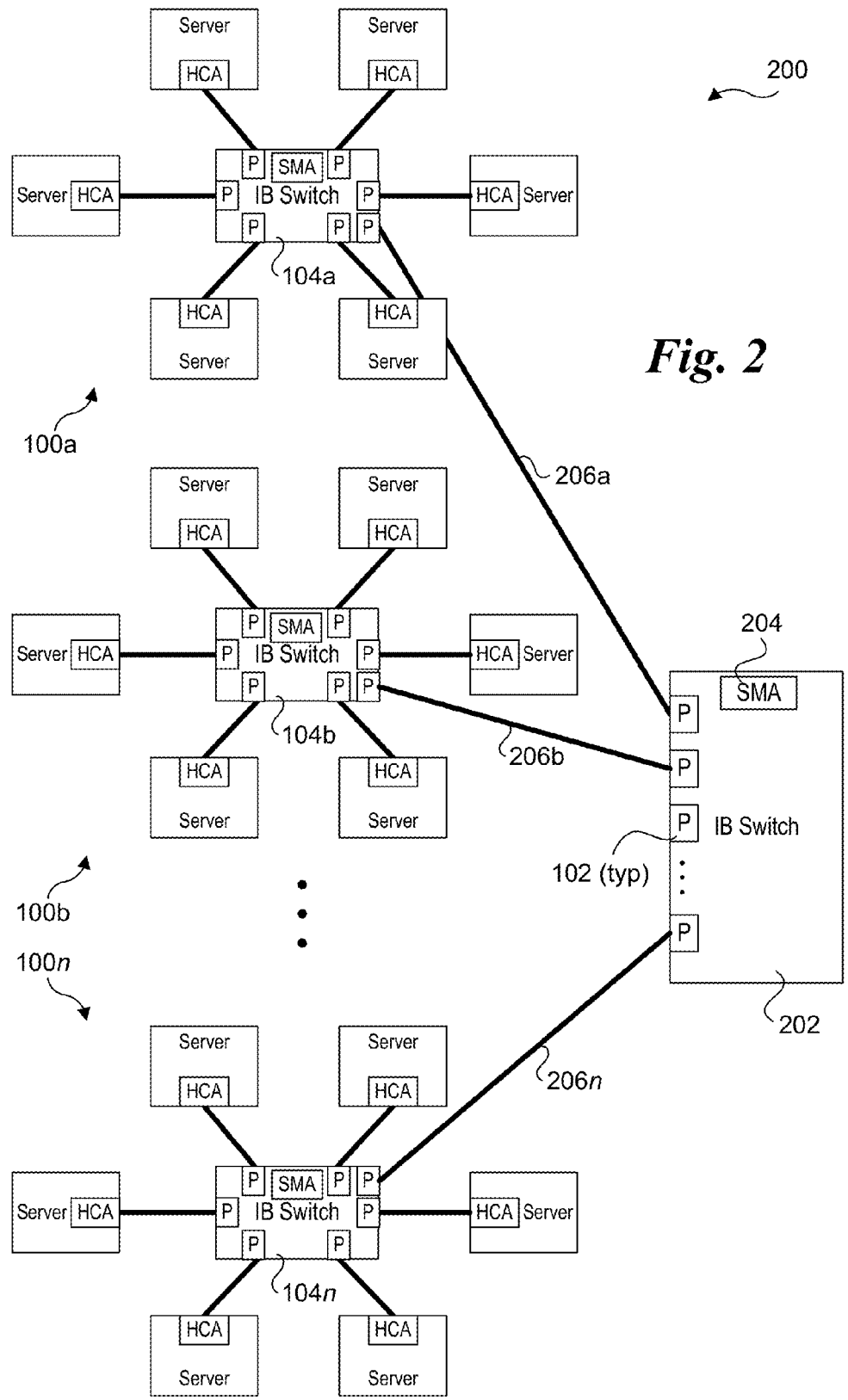
FIG. 2 is a schematic diagram illustrating multiple sub-clusters connected to an InfiniBand switch forming a cluster.

FIG. 1 depicts a sub-cluster 100 of six servers 102 (labeled 102a-102f), each of which is linked to an InfiniBand switch 104, wherein the servers links form a "star" configuration. In further detail, each server 102 includes an IB HCA 106 having a port linked in communication with a respective port 108 (labeled 'P') on IB switch 104 via a respective link 110. IB switch 112 further includes a subnet management agent (SMA) 112. FIG. 2 illustrates a server cluster 200 comprising n sub-clusters 100a-100n having a similar configuration to sub-cluster 100 of FIG. 1. The respective IB switches 104a-104n each include a port that is linked in communication to a corresponding port on an IB switch 202 over a respective link 206a-206n. IB switch 202 additionally includes an SMA 204.

Cluster 200 is illustrative of a cluster employing an IB switch hierarchy having two levels—one IB switch at the top level and n IB switches at the second level. However, this is merely illustrative of a generalized IB switch hierarchy architecture having m levels. For illustrative purposes, embodiments disclosed herein are discussed in the content of a two-level IB switch hierarchy; however, it will be understood that the teachings and principles of these embodiments may be extended to an m level IB switch hierarchy.

Generally, servers 102 in an InfiniBand architecture are also referred to as "end-nodes," while the links between the end-nodes and IB switches, and between IB switches and other IB switches collectively comprise an IB fabric. A server including an IB HCA may also be referred to as an HCA host or host server.

Figure 3:
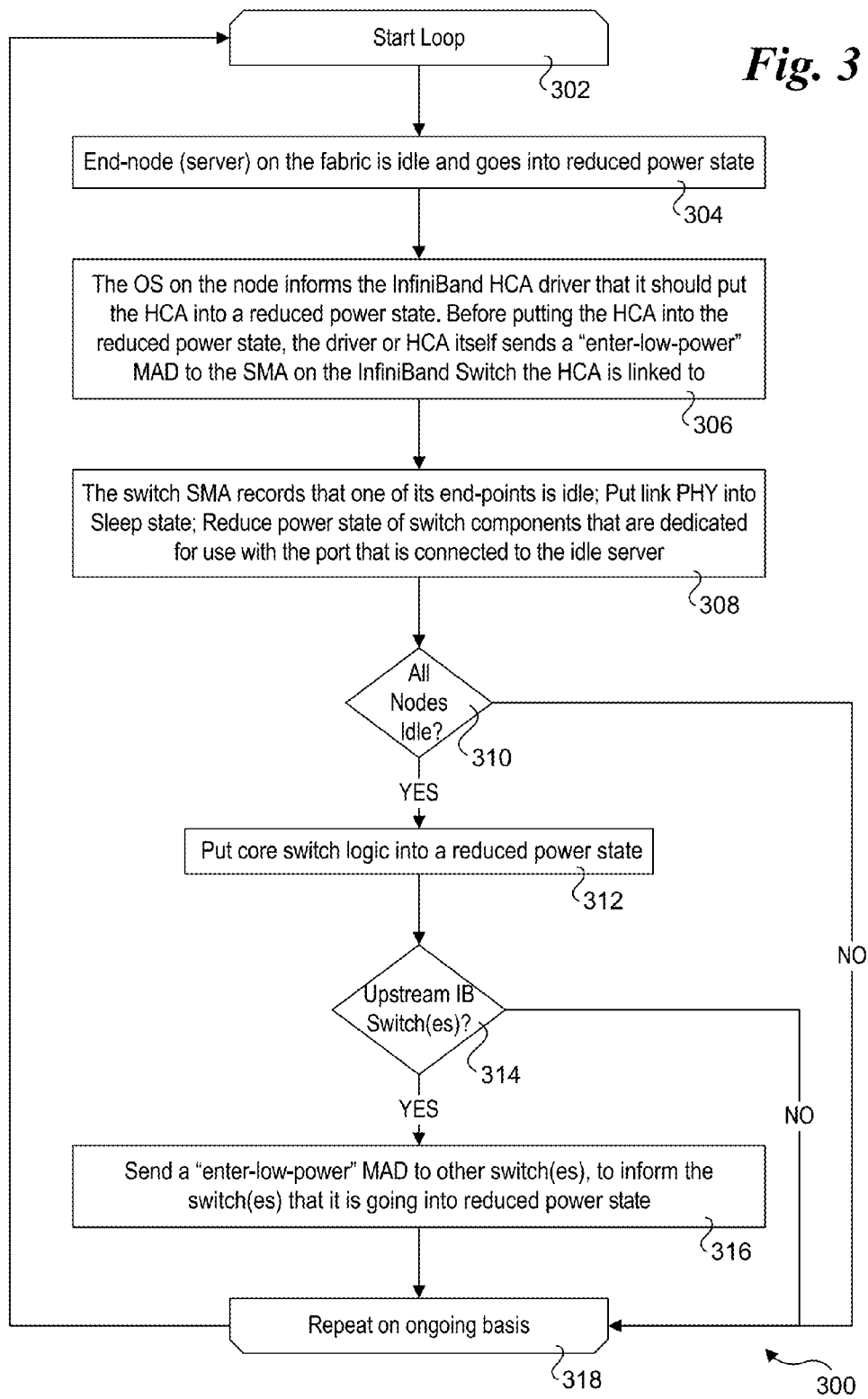
FIG. 3 is a flowchart illustrating operations and logic for reducing the power state of IB components in connection with detection of changes in power states to attached host servers, according to one embodiment.

In accordance with an aspect of some embodiments, techniques are disclosed for selectively controlling the power state of individual IB switch ports and associated circuitry, as well as entire IB switches themselves as a function of the power states of the HCA host servers linked in communication with the IB switch ports (or optionally as a function of the power states of the links and ports). FIG. 3 shows a flowchart 300 illustrating operations and logic for reducing the power state of IB components in connection with detection of changes in power states to host servers, according to one embodiment. As depicted by start and end loop blocks 302 and 318, the operations and logic depicted between these block is implemented on an ongoing basis.

In a block 304, an end-node on the fabric (e.g., a server 102 including an HCA 104) is idled as a result of a decrease in data center workload or for other reasons. This idle workload state is detected by the server's operating system (OS), which is configured to put some or the server's various components into a reduced power state. Generally, some components in the server may support multiple reduced power states, such as a processor, while other components may support one of two power states—a full power state and a low power state, or multiple power states that may be the same or different from the processor power states.

In connection with reducing the power state of the server, the host OS instructs the IB HCA driver to put the HCA into a reduced power state, as depicted in a block 306. Before putting the HCA into the reduced power state, the IB HCA driver or the HCA itself (e.g., via embedded logic) sends an "enter-low-power" power management datagram (MAD) to the SMA on the IB switch the HCA is linked to. This is also referred to herein as a power down MAD.

In a block 308, the switch's SMA records that one of its end-points (e.g., a server connected to one of its ports) is idle. The link's Physical Layer (PHY) transmitters and receivers for the port connected to the idle server are then put into a "sleeping" state in accordance with InfiniBand's link power management protocol, as described below in further detail. The power state of the switch components that are detected for use with the port connected to the idle server are then reduced, also as described in further detail below.

The flowchart logic next proceeds to a decision block 310 in which a determination is made to whether all of the nodes having HCA's linked to the IB switch's ports are idle. If NO, the logic proceeds to end loop block 318, whereupon it returns to start loop block 302 to begin a next iteration of the logic. If the answer is YES, the logic proceeds to a block 312 in which the core switch logic is put into a reduced-power state.

In a decision block 314 a determination is made to whether the IB switch is connected to any upstream IB switches—that is, any switches at a higher level in the IB switch hierarchy. If YES, in a block 316 the IB switches sends a "enter-low-power" MAD to these upstream IB switches to inform each of the upstream IB switches that it is going into a reduced-power state. If the answer to decision block 314 is NO, the logic loops back to start loop block 302 via end loop block 318, as shown.

Figure 3A:
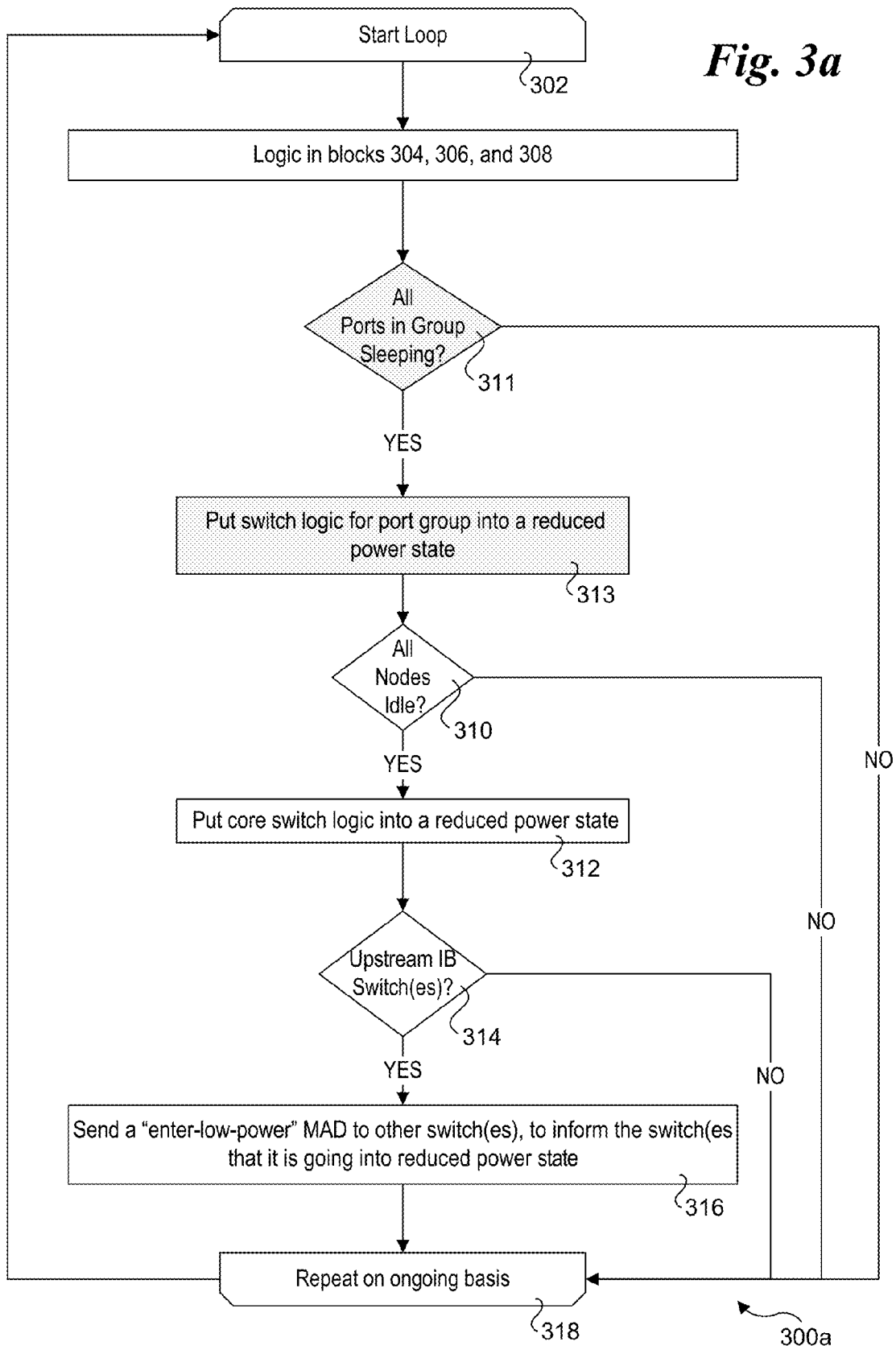
FIG. 3a is a flowchart comprising an augmented version of the flowchart of FIG. 3 that is implemented for an InfiniBand switch employing multi-port IB interfaces, according to one embodiment.

In addition to reducing the power of components at the individual port and across the entire switch level, in one embodiment, multiple ports and associated circuitry may be powered up or down on a per-group basis. FIG. 3a shows an augmented flowchart 300a that includes additional logic and operations for implementing this feature. Generally, the operations and logic in flowcharts 300 and 300a are identical, except for the addition of a decision block 311 and block 313 in flowchart 300a, as depicted with a light gray background. In decision block 311 a determination is made to whether all of the ports in a group are operating in a reduced-power state, such as a sleeping state defined for InfiniBand PHYs. If the answer is YES, the switch components and/or logic for the port group is put in a reduced power state in a block 313. If some of the ports in a group are operating in a full-power state, the answer to decision block 311 is NO, resulting in the logic proceeding to end loop block 318.

Figure 4:
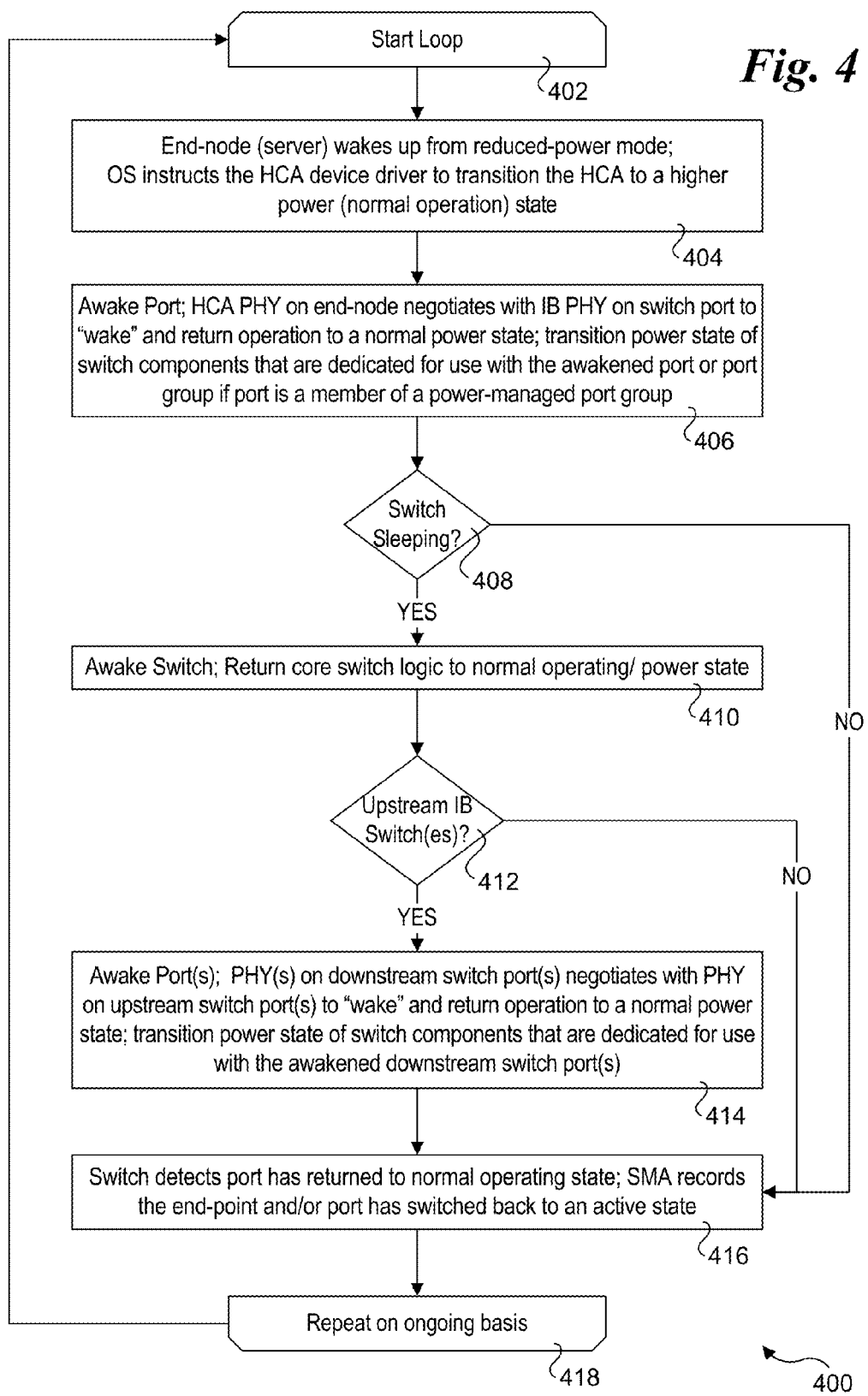
FIG. 4 is a flowchart illustrating operations and logic for returning the power of applicable InfiniBand switch components and logic to a normal operating level in response to detection that an end-node (host server) has been returned to a normal operating state, according to one embodiment.

FIG. 4 shows a flowchart 400 illustrating operations and logic for returning the power of applicable switch components and logic to a normal operating level in response to detection that an end-node has been returned to a normal operation state. As delineated by start and end loop blocks 402 and 418, the operations and logic is repeatedly performed on an ongoing basis.

In a block 404, an end-node wakes up from a reduced-power mode. For example, a system management entity or the like may signal the server's baseboard management logic to return to a normal operating state. In response, the host OS instructs the HCA driver to transition the HCA to a higher power (normal operating) state.

Previously, in accordance with block 308, the PHY components in the ports at each end of the link were put into a sleeping state using the InfiniBand power management protocol. To awake the HCA port and the IB ports on the opposing ends of the link and return the ports and link to a normal operating and power state, the HCA on the end-node sends a "wake" signal to the PHY on the IB switch port it is linked in communication with, as shown in a block 406. This results in the PHYs in the link ports and the link itself returning to a normal operating and power state under which data may again be transmitted over the link. Additionally, the power state of the switch components dedicated for use with the awakened port is also returned back to the normal operating power state. If the port is a member of a power-managed group of ports, the operating power state of the components and circuitry used to support operation of the group of ports is also restored to a normal state.

Continuing at a decision block 408, a determination is made to whether the IB switch itself was in a reduced-power state, such as a sleeping state. In one embodiment the port PHYs on an IB switch are configured to operate in an autonomous manner, wherein the port PHYs themselves can be brought back to normal operating and power state independent of the operating and power state of other components on the IB switch, including the IB switch's core logic. Under this approach, the IB switch itself can be awoken by first waking one of the ports on the switch, such as is performed in block 406. In one embodiment, the IB switch includes circuitry and logic to detect the operating state of each port, including when the IB switch is operating in a reduced-power state. Accordingly, upon detecting that one of its ports has returned to a normal operating state while the IB switch is in a sleeping state or similar reduced-power state, the answer to decision block 408 is YES, and the switch is awoken in a block 410. Awaking the switch results in returning the core switch logic and other applicable components/logic to their normal operating and power state. If the switch was already operating in its normal power state, the answer to decision block 408 is NO, and the logic proceeds to a block 416.

In a decision block 412, a determination is made to whether the awakened IB switch is connected to any upstream IB switches. If the answer is YES, the applicable ports on the (downstream) IB switch and each upstream IB switch are awoken in a manner similar to waking the link ports and PHYs in block 406. As a result, any links between the IB switch and an upstream IB switch are returned to a normal operation and power state in block 406.

In block 416 the switch detects that its port has returned to a normal operating state. In response, the switch's SMA records the end-point and/or the port has been switched back to an active state (e.g., a normal operating state). The logic then proceeds to end loop block 418, whereupon it is returned to start loop block 402 to begin a next iteration.

FIG. 4a shows a flowchart 400a illustrating operations and logic for returning the power of applicable switch components and logic to a normal operating level in response to detection that an end-node has been returned to a normal operating state for an IB switch having an SMA that remains in standby mode when the IB switch is in a reduced power state. In this case, the SMA can receive explicit instructions and/or information via one or more MADs to cause reconfiguration of the IB switch. Generally, the operations and logic for blocks in flowcharts 400 and 400a having the same reference numbers are similar. Flowchart 400a includes additional block 407 and 417, and doesn't include block 416.

Following the operations of block 406, in block 407 the HCA driver or HCA itself sends a "power-up" MAD to the standby SMA via the port that was awakened in block 406. The SMA records the end-point and/or port has switched back to an active state. As with flowchart 400, a determination is made to whether the IB switch is operating in a sleeping state or similar reduced-power state. If so (YES), the logic proceeds to a block 410a in which the switch is awaken by the SMA. In response, the core switch logic and other applicable circuitry and logic is returned to a normal operating and power state.

If the IB switch is connected to one or more upstream switches, as determined by decision block 412, the applicable ports and associated circuitry are awakened in block 414 in a similar manner to that described above for flowchart 400. In addition, in a block 417, the IB switch sends a "power-up" MAD to the SMA for each upstream IB switch to inform each upstream switch the IB switch is returning to a normal power state.

Figure 5:
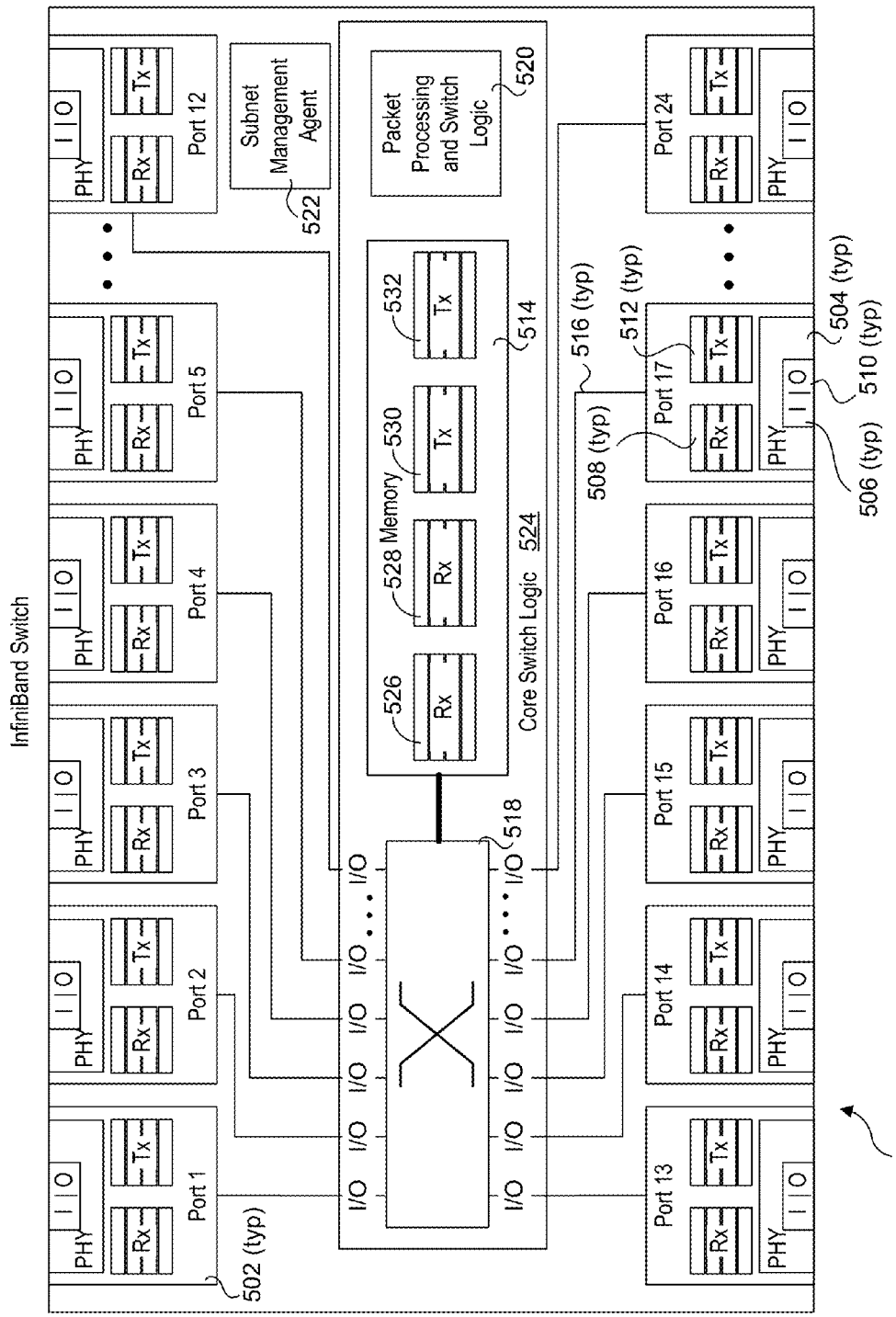
FIG. 5 is a schematic diagram illustrating an embodiment of a power-managed InfiniBand switch that is configured to support putting individual ports in reduced-power states, as well as putting the switch's core logic in a reduced-power state.

FIG. 5 shows an embodiment of a power-managed InfiniBand switch 500 that is configured to support putting individual ports in reduced-power states, as well as putting the switch's core logic in a reduced-power state. InfiniBand switch 500 includes 24 ports 502, each including a physical interface 504 including an input port 506 coupled to a receive (Rx) buffer 508 and an output port 510 coupled to a transmit (Tx) buffer 512. Each port 502 is interconnected to memory 514 via interconnect circuitry and logic, collectively illustrated by interconnect lines 516 and a cross-bar switch 518. InfiniBand switch 500 further includes packet processing and switch logic 520, and a subnet management agent 522. In the illustrated embodiment, cross-bar switch 518, memory 514 and packet processing and switch logic 520 comprise core switch logic 524. In some embodiments, subnet management agent 522 may also be operated as part of an IB switch's core switch logic. In addition, although depicted as being part of core switch logic, cross-bar switches and other interconnect circuitry may be operated in power states that are separate from the power states described herein for core switch logic.

During normal operations, each of ports 502 that are linked with an active IB HCA or another IB switch will be operating in a normal power state and operate in accordance with an applicable InfiniBand protocol. Accordingly, physical interface 506 is configured to implement PHY layer operations in accordance with the applicable IB protocol. In addition to the components shown, each port 502 also includes additional circuitry and logic to implement the applicable IB protocol. In some embodiments, various packet processing operations may be performed at the ports themselves, such as MAC (media access channel) layer operations, and potentially some layer 3 operations.

Packet processing and switch logic 520 are used to depict applicable circuitry and logic for implementing packet processing operations beyond which may be performed at ports 502 and implement switching operations. Generally, these operations will be facilitated by one or more processing elements, such as a processor with one or more cores, an embedded network processor or the like, multiple processor engines, and/or other embedded logic. The processing elements may generally execute software and/or firmware instructions configured to implement packet processing and switch operations. Generally, such software and/or firmware may be stored in non-volatile storage on the switch itself, or may be downloaded over a network in conjunction with initializing switch operations.

During initialization operations and/or ongoing operations, packet processing and switch logic 520 will allocate various portions of memory 514 for corresponding buffers or queues, as depicted by Rx queues 526 and 528 and Tx queues 530 and 532. The illustrated queues are abstracted for convenience and clarity; in a typical implementation, each active port will generally be allocated at least one receive and transmit queue, and may implement multiple receive and transmit queues for different traffic classes. Optionally, queues for a given traffic class may be shared across ports.

Subnet management agent 522 is configured to implement various SMA operations discussed herein. In some embodiments, SMA 522 comprises standalone circuitry and logic, such as a microcontroller or low-power single core processor. In other embodiments, SMA 522 is implemented via software and/or firmware instructions executed on a processor core or other processing element that is part of a processor or other processing element used to implement packet processing and switch logic 520. In this latter case, SMA 522 will generally be part of core switch logic 524 from a power-management standpoint. In one embodiment, a multi-core processor dedicates one of its cores to support standby operations, wherein that core remains in a normal operating state, while other cores may be selectively put in reduced power states.

Figure 5A:
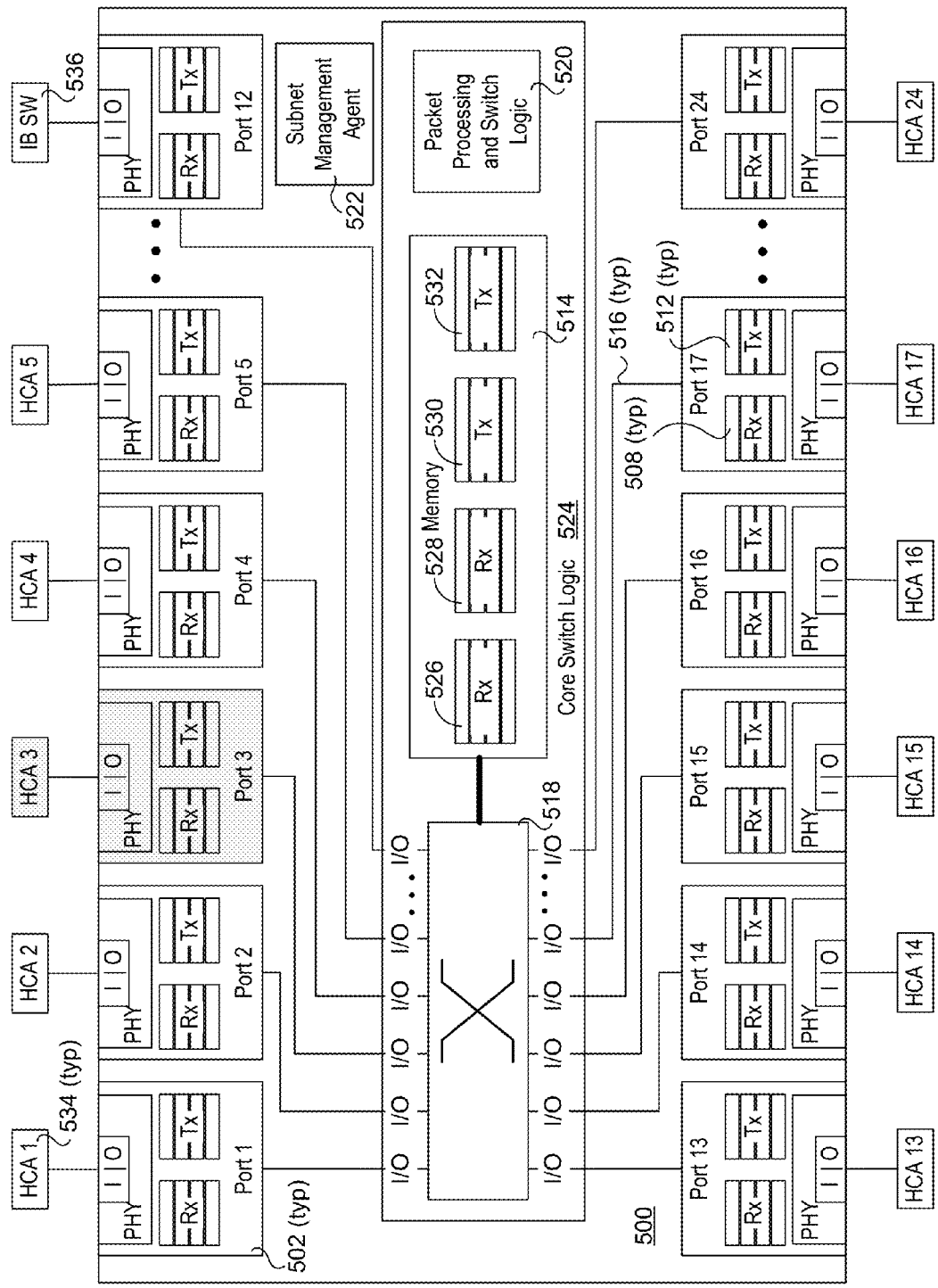

FIG. 5a illustrates an example of InfiniBand switch 500 reducing power at a single port in response to detecting a host server connected to the port has gone idle. For illustrative purposes, each of ports 1-5, 13-17, and 24 are shown connected to an HCA 534; however, it is noted that some ports may not be connected to a host server or other end-node, and such ports may be selectively disabled. Each of HCAs 534 is installed in or otherwise operatively coupled to a host server (not shown). In this example, the host server having its HCA linked to port 3 has switched operation to a reduced-power state under which its associated HCA has been put into a sleeping state in accordance with the InfiniBand power management protocol. Prior to entering the sleeping state, the host server HCA driver or HCA itself sends a "enter-low-power" MAD to SMA 522, as discussed above in block 306 of flowchart 300 in FIG. 3. In response, the HCA and port 3 exchange control input MADs to enter "sleeping" state, which puts the physical interface for port 3 into the IB sleeping state. In response to detection of the physical interface entering the sleeping state and/or in conjunction with a control input from SMA 522, the circuitry and logic dedicated for port 3 is put into a reduced-power state, as depicted by the of a light gray background for port 3.

Figure 5B:
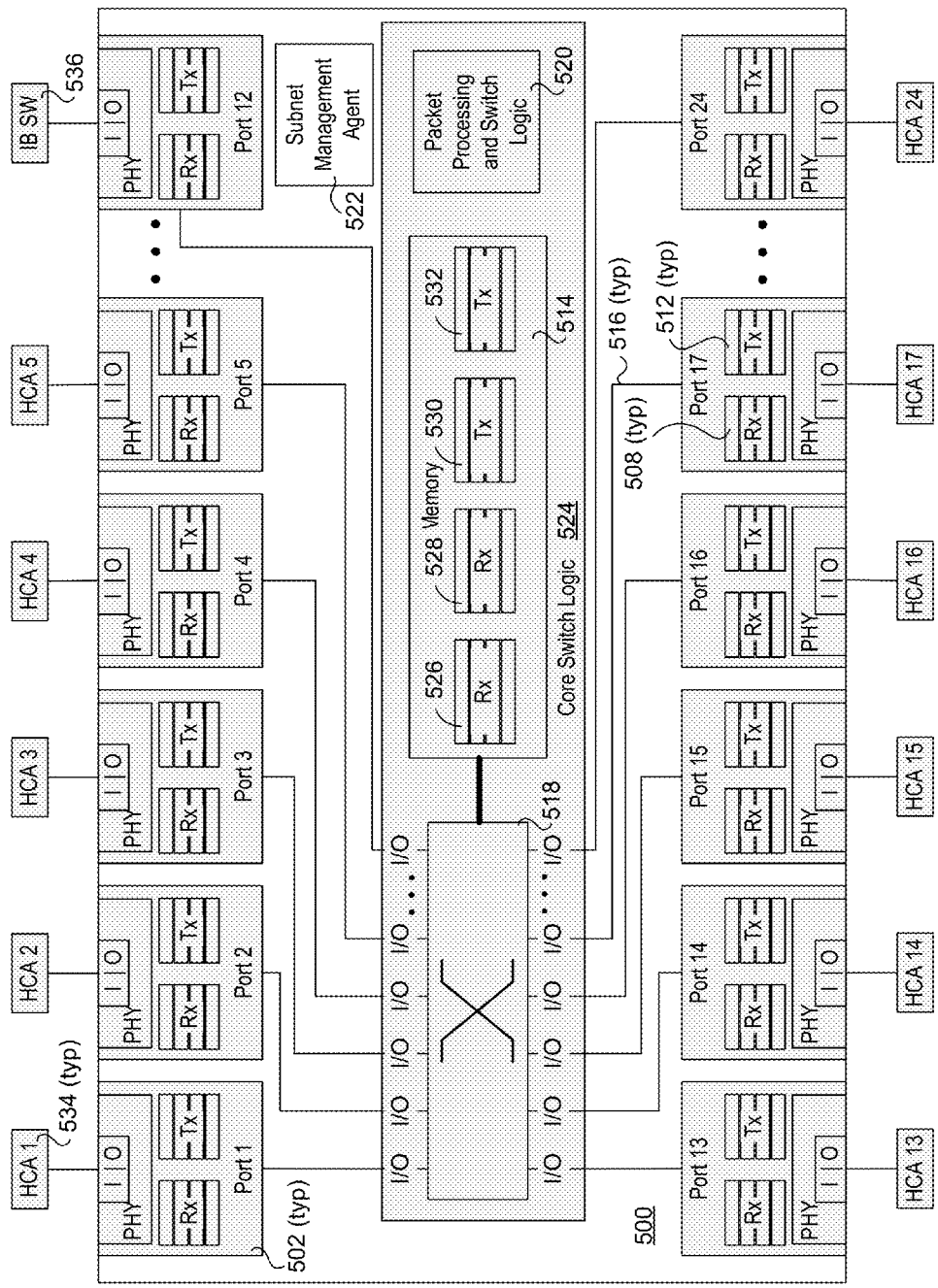

FIG. 5b illustrates an example of SMA 522 putting all of the ports 502 and core switch logic 524 of InfiniBand switch 500 into a reduced power state upon detection that all of the host servers connected to the ports 502 via their respective HCAs are in either a reduced power state or taken offline entirely. This corresponds to the operations and logic depicted in decision block 310 and block 312 of flowchart 300. In conjunction with these operations, InfiniBand switch 500 sends an "enter-low-power" MAD to an upstream IB switch 536 via port 12 in accordance with block 316 of flowchart 300. Following this, the physical interface of port 12 is put into an IB sleeping state, and the dedicated circuitry and logic for port 12 is put in a reduced-power state.

Figure 5C:
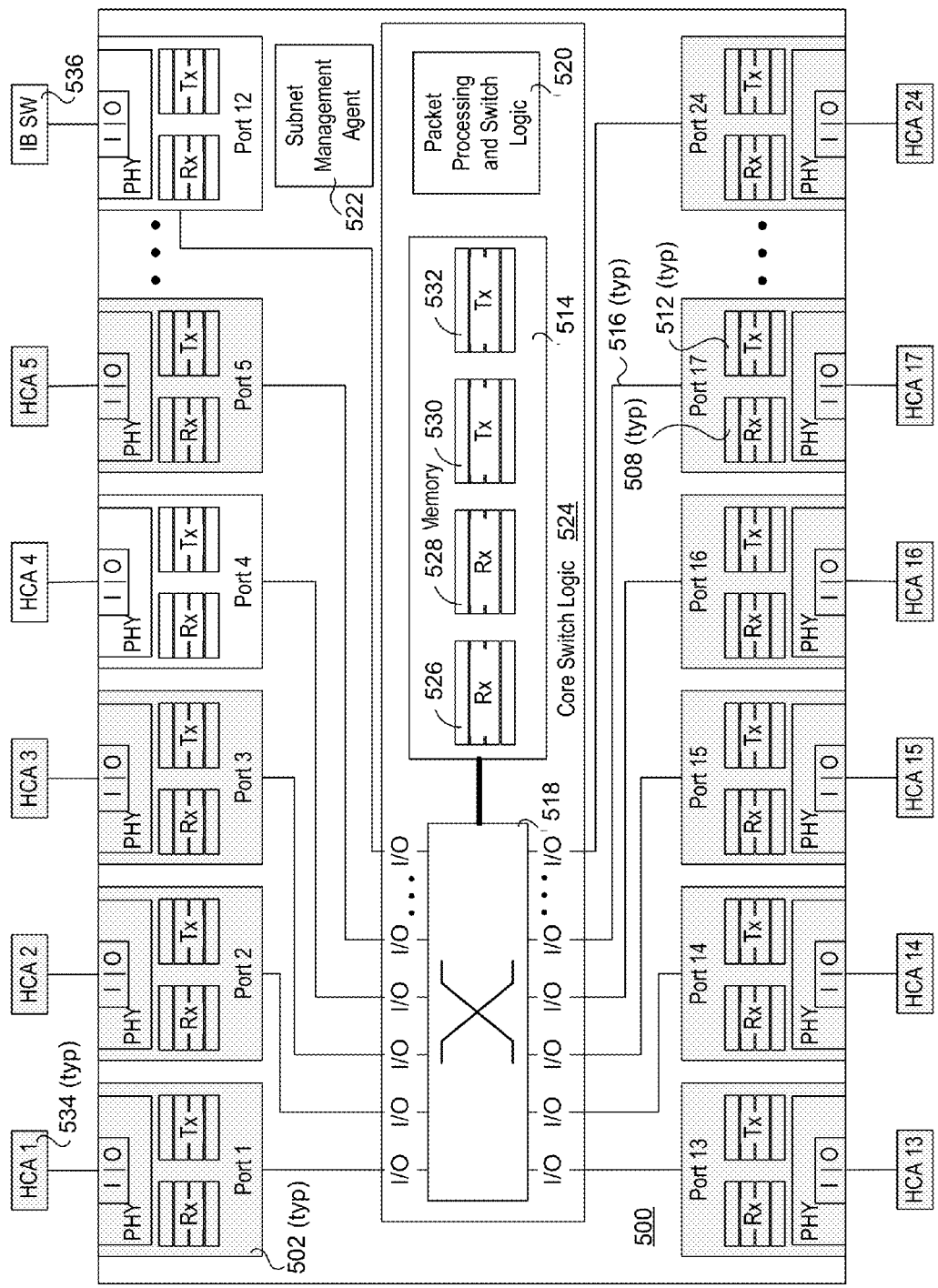

FIG. 5c shows the result of the host server for HCA 4 returning to a normal operating state. As discussed above, in one embodiment the operation and logic of flowchart 400 of FIG. 4 is implemented for returning HCAs and IB switch components from reduced-power and sleeping states to normal operating and power states. Accordingly, in response to HCA 4's host server returning to its normal operating state, the PHYs for HCA 4 and port 4 are returned from their sleeping states to a normal power state, as described above for block 406. In accordance with decision block 408 and block 410, powering up of port 4 is detected by SMA 522, resulting in core switch logic 524 being returned to a normal operating and power state. In addition, the PHYs and the link between port 12 and IB switch 536 is returned from their sleeping state to a normal operating state in accordance with decision block 412 and block 414. In block 416, SMA 522 records that the host server for HCA 4 has switched back to an active state.

Figure 6:
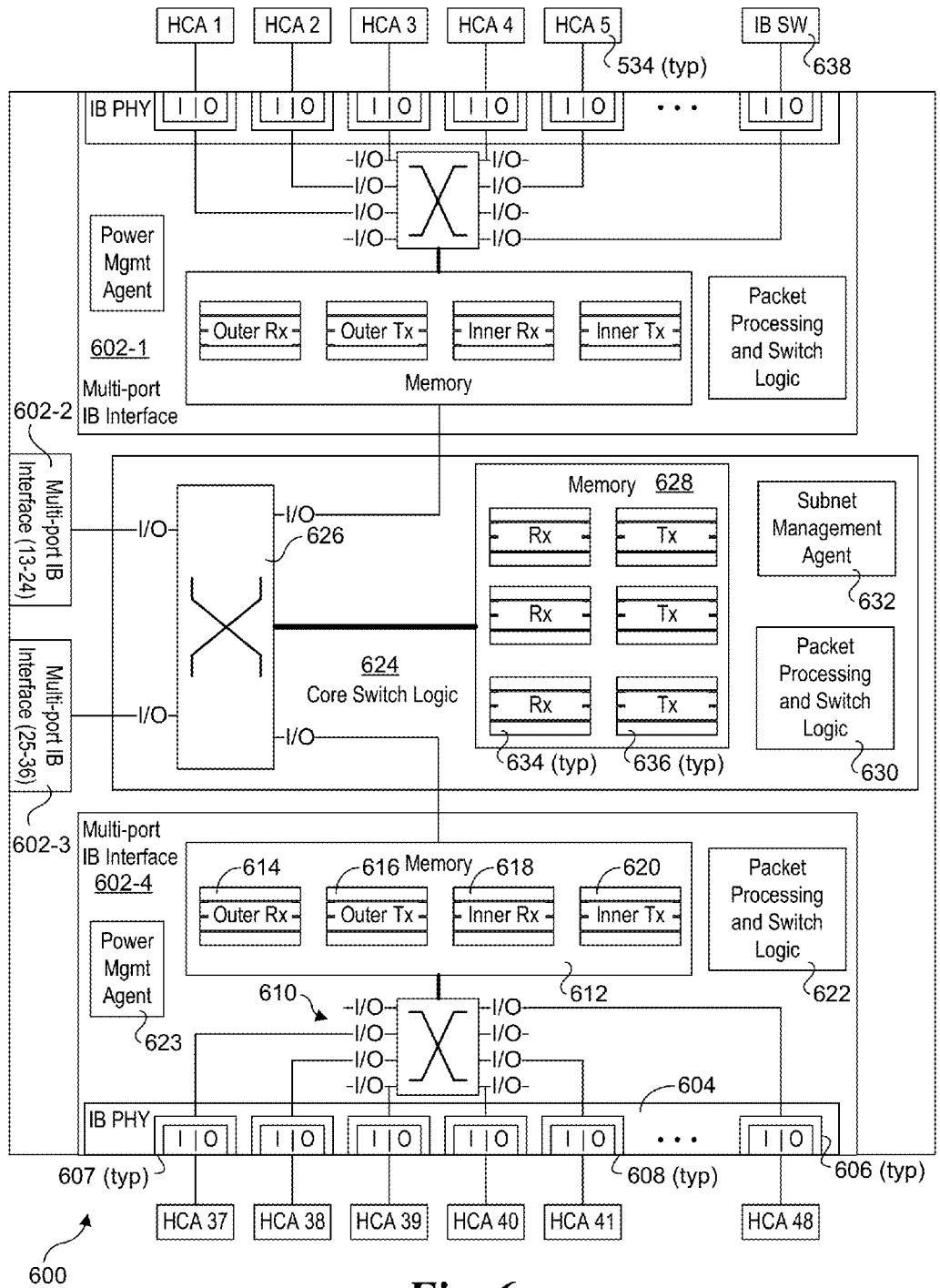
FIG. 6 is a schematic diagram illustrating an embodiment of a power-managed InfiniBand switch including multi-port IB interfaces that are configured to support putting individual ports and individual multi-port IB interfaces in reduced-power states, as well as putting the switch's core logic in a reduced-power state.

FIG. 6 shows an InfiniBand switch 600 under which power management of IB ports is on a group-wise basis. InfiniBand switch 600 includes four multi-port IB interfaces 602, labeled 602-1, 602-2, 602-3, and 602-4, each having 12 ports for a total of 48 ports. It is noted that this configuration is merely exemplary, as the number of ports in a group generally may be two or greater, and the total number of ports may generally range from 6-96 although this is not limiting. As shown for multi-port IB interface 602-4, each multi-port IB interface 602 includes an IB physical interface 604 including a plurality of ports 606, each including an input port 607 and an output port 608 and (optionally) associated input and output port buffers (not shown for clarity). For simplicity, a single block for IB physical interface 604 is shown; however, it will be understood that each port 606 may have its own IB physical interface that is operated independent for the other ports.

A cross-bar switch 610 is configured to selectively couple input and output port buffers (as applicable) to local memory 612, which is depicted as including four queues including an outer receive queue 614, an outer transmit queue 616, an inner receive queue 618, and an inner transmit queue 620. Under this configuration, the outer queues are used for data that is received at a given multi-port IB interface that is to be forwarded back out the same multi-port IB interface. The inner queues are used for data that is forwarded out a different multi-port IB interface than used to receive the data. It is noted that this is merely exemplary, as various types of queue configurations may be implemented in local memory 612. As before, there may generally be one or more queues for each port, and there may different queues to support multiple traffic classes, either on an individual port basis, shared port basis, or a combination thereof.

Each multi-port IB interface 602 further includes packet processing and switch logic 622, which is generally used to perform aspects of packet processing and (optionally) switch operations that are performed at the local multi-port level rather than across the IB switch as a whole. Depending on the particularly implementation, the operations performed by packet processing and switch logic 622 may be fairly similar to the operations performed by a single port, such as discussed above for InfiniBand switch 500, or they could be more complex, ranging all the way up to similar operations performed by packet processing and switch logic 520 for InfiniBand switch 500 discussed above. The processing facilities for implementing packet processing and switch logic 622 may also vary, depending on the complexity of the operations and/or speed the operations are to be performed. For example, the processing facilities may range from a microcontroller or the like to a multi-core processor. Additionally, all or a portion of the packet processing operations may be implemented by embedded hardware logic.

Each multi-port IB interface 602 may also include a power management agent 623, or optionally, power management logic that performs similar operations may be implemented as part of core switch logic 624, and such power management agent 623 is implemented as a power management interface configured to communicate with a power management entity in core logic 624 (not shown) and/or a subnet management agent 632. In one embodiment, the power state of the circuitry on each multi-port IB interface 602 exclusive to the PHYs is managed by its power management agent 623 in cooperation with SMA 632. Optionally, each port may include its own power management logic and operate in a substantially autonomous manner.

In addition to SMA 632, core switch logic 624 includes a cross-bar switch 626, memory 628, and packet processing and switch logic 630. Optionally, SMA 632 may operate in a separate power domain than core switch logic 624 (e.g., SMA 632 is always provided with at least standby power in one embodiment), in which case SMA 632 is not part of core switch logic 624.

Generally, packet processing and switch logic 630 performs operations that are similar to packet processing and switch logic 520 of InfiniBand switch 500. It is also possible to split the packet processing and switch operations between packet processing and switch logic 622 and packet processing and switch logic 630, such as having the former perform packet processing below the application layer, and have the latter perform packet processing at the application layer and above, as applicable. In connection with the packet processing and switch operations, packet processing and switch logic 630 is configured to allocate a plurality of receive queues 634 and transmit queues 636 in memory 628.

FIG. 6 also show various HCAs 534 connected to respective ports on the multi-port IB interfaces 602. In order to not further obscure FIG. 6 with additional port identification nomenclature, each port may be referenced by the HCA number for the HCA connected to that port, e.g., port 1 is connected to HCA 1, port 2 is connected to HCA 2, etc.

Figure 6A:
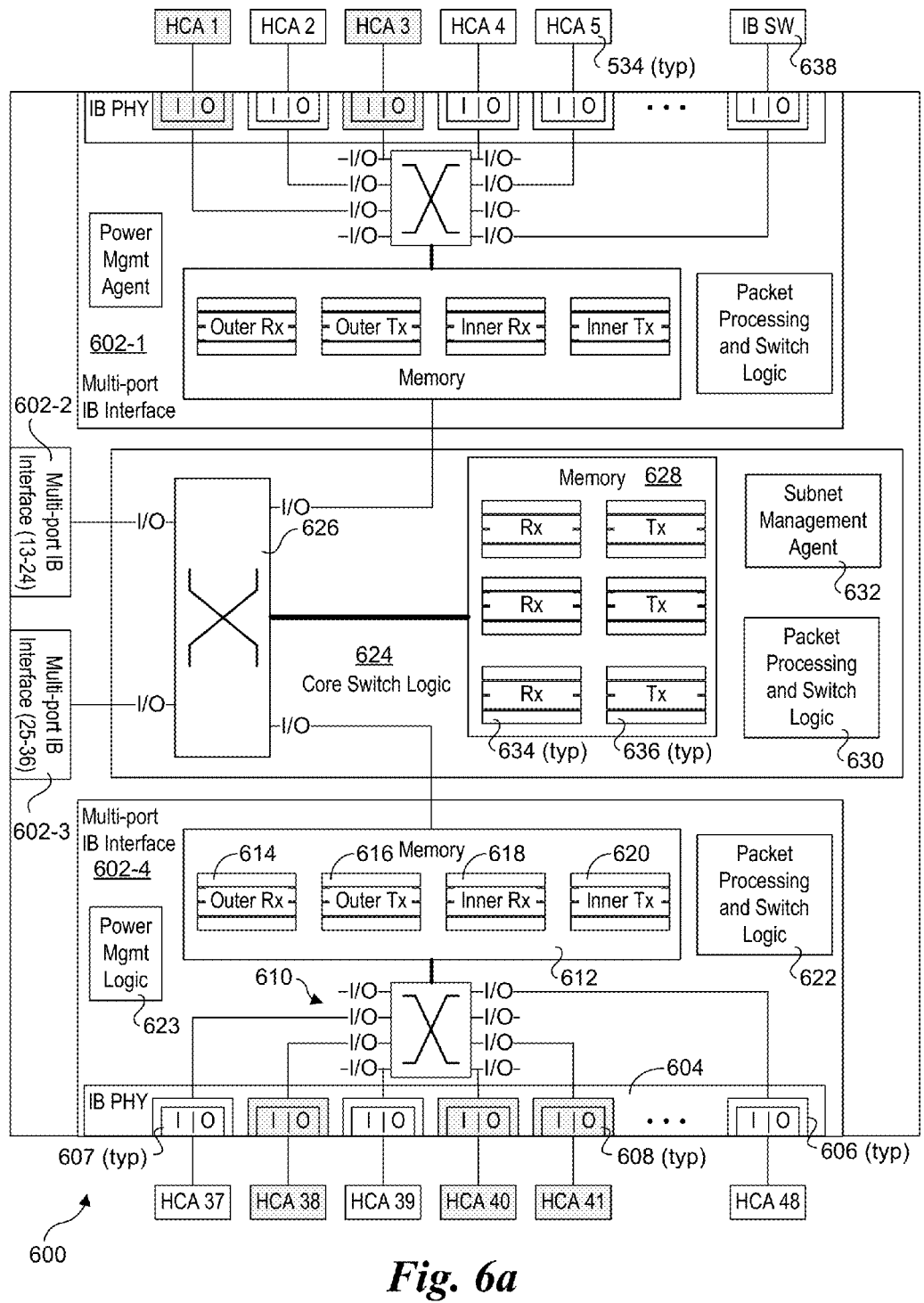

FIG. 6 shows an initial configuration under which the host servers for all HCAs 534 are operating in normal power states. Accordingly, each of ports 606 is operating in its normal power state. As shown in FIG. 6a, the host servers for HCAs 1, 3, 38, 40, and 41 are either in a reduced-power state or offline. Accordingly, the PHYs for each of ports 1, 3, 38, 40, and 41 is put into a sleeping state per the IB power management protocol and dedicated circuitry for each of ports 1, 3, 38, 40, and 41 is put in a reduced power state, while the remaining circuitry in each of multi-port IB interfaces 602-1 and 602-4 remains in the normal power state. As discussed above, the power state of the dedicated circuitry for each port may be managed by power management agent 623, or the power-state of the port circuitry may be managed by the port itself.

Figure 6B:
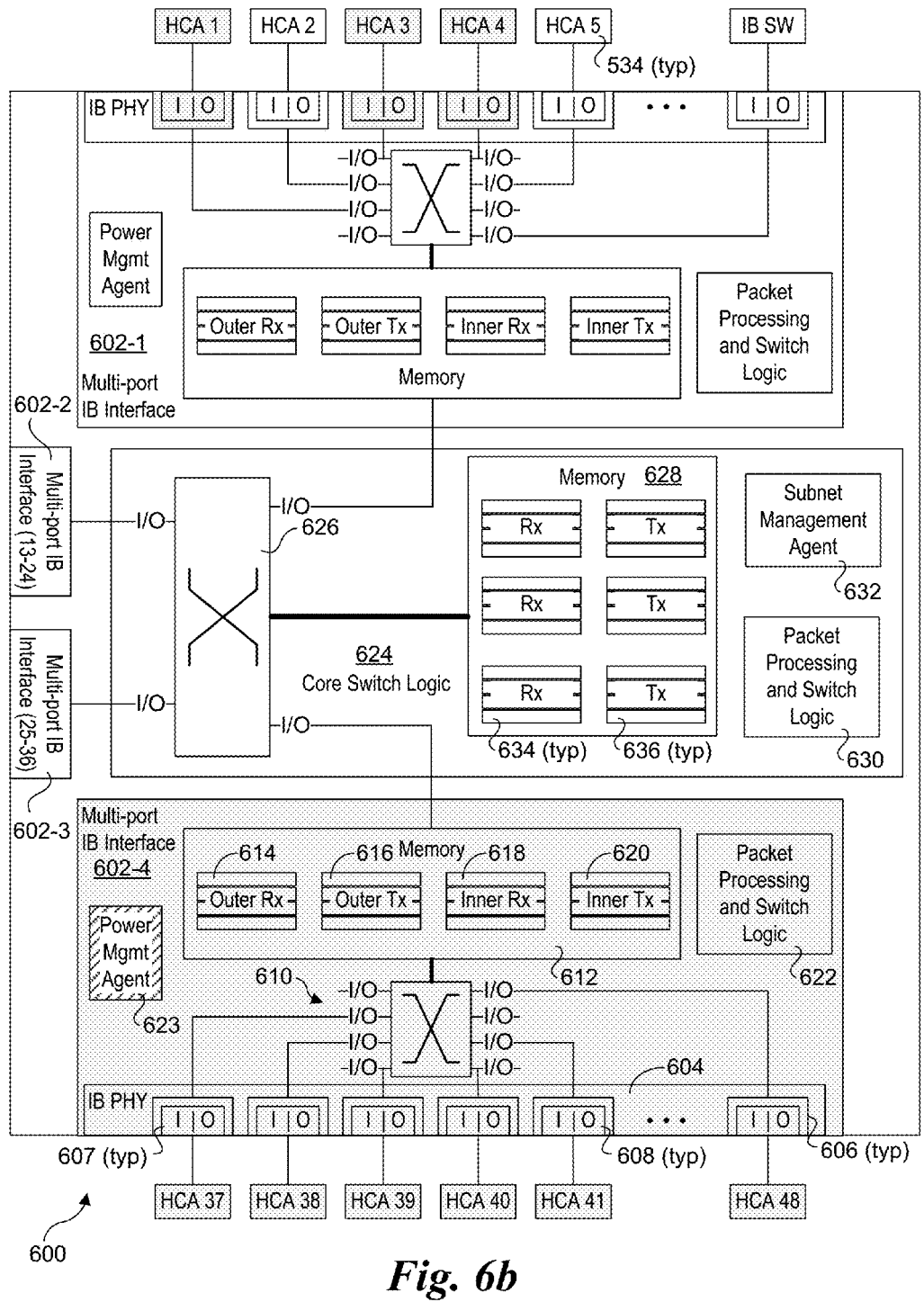

As shown in FIG. 6b, at this point the host server for HCA 4 and the host servers for HCAs 37-48 are in a reduced-power or offline state. Since there are ports in multi-port IB interface 602-1 still active, the PHY for port 4 is put into a sleeping state and the dedicated circuitry for port 4 is put in a reduced-power state. Meanwhile, since all of the ports for multi-port IB interface 602-4 are connected to host servers that are either in a reduced power state or offline, multi-port IB interface 602-4 is transitioned to a reduced-power state (in conjunction with ports 37-48 put into a sleeping state). In the illustrated embodiment, power management agent 623 remains in a standby power state.

Figure 6C:
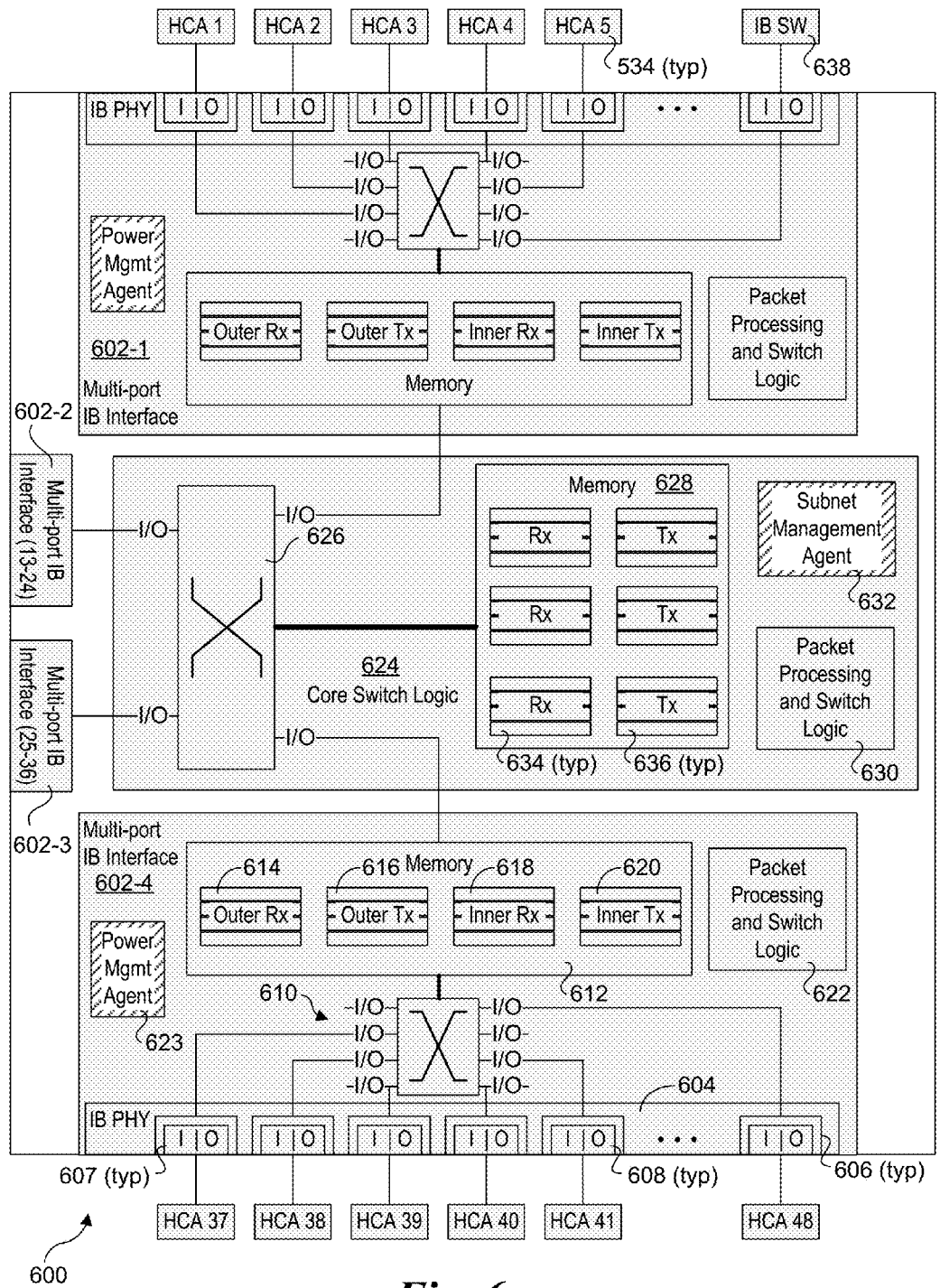

In FIG. 6c, all of the host servers connected to InfiniBand switch 600 are either in a reduced-power state or offline. In response to detecting this situation, each of multi-port IB interfaces 602-1, 602-2, 602-3, and 602-4, and core switch logic 624 is put in a reduced-power state. As depicted, subnet management agent 632 is put into a standby power state. In addition, as described above in decision block 314 and block 316 of flowchart 300a, a power down MAD indicating the IB switch 600 will be entering a reduced-power state such as a "enter-low-power" MAD is sent to IB switch 638, and the PHYs of the ports connecting IB switch 638 to IB switch 600 are put into a sleeping state.

Figure 6D:
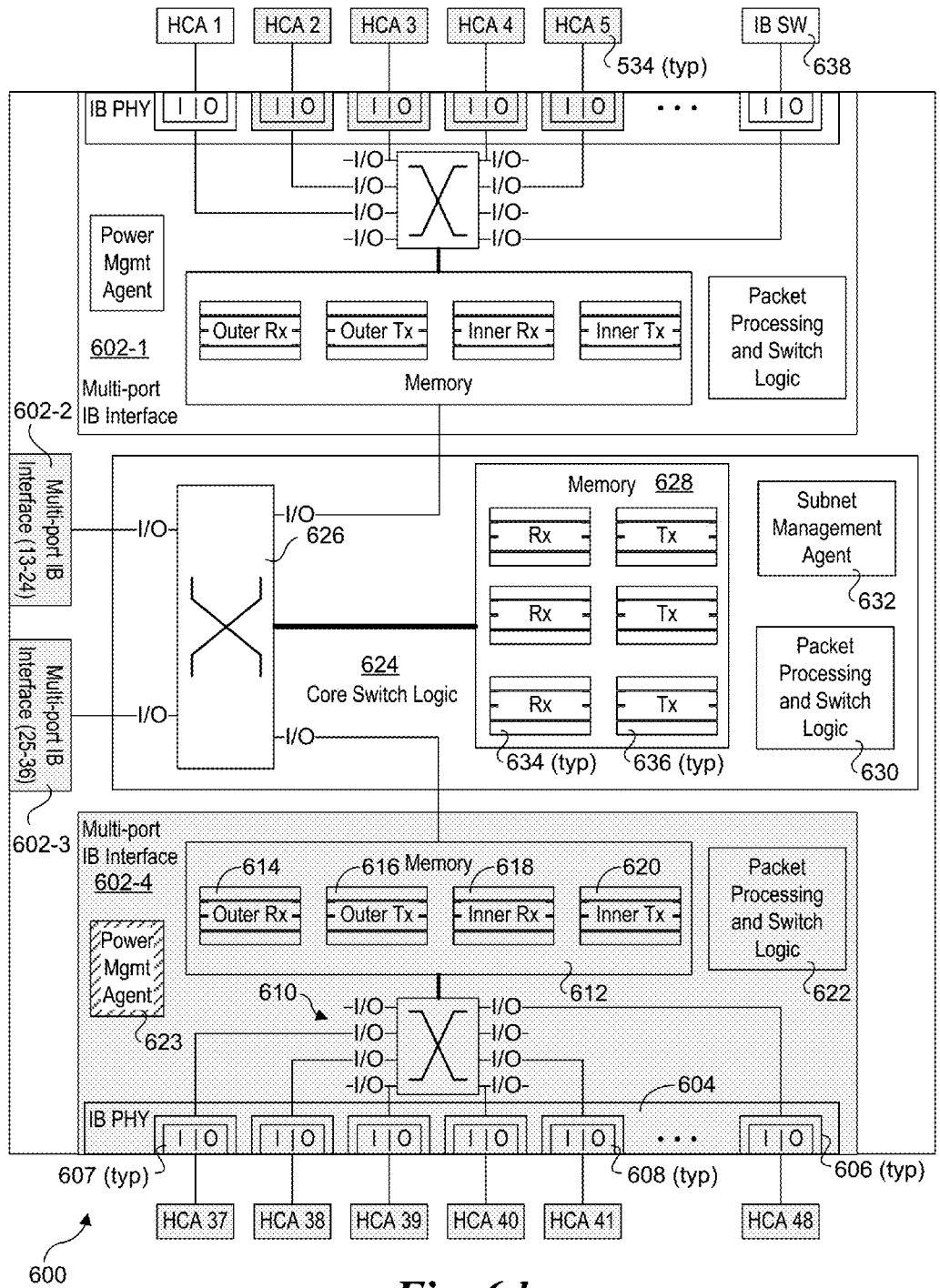

FIG. 6d shows the result of the host server for HCA 1 returning to a normal operating state. As before, these operations are performed in accordance with the operation and logic of flowchart 400 of FIG. 4. In response to the host server for HCA 1 returning to a normal operating state, the PHYs for HCA 1 and port 1 are returned from their sleeping states to a normal power state. Powering up of port 1 is detected by power management agent 623, resulting in the portion of multi-port IB interface 602-1 that is shared across ports being returned to a normal operating and power state, while leaving the components dedicated to the ports connected to HCAs 2-11 in there reduced-power and/or sleeping states. Additionally, core switch logic 624 is returned to a normal operating and power state, and the link between IB switch 600 and IB switch 638 is returned to an active state.

Figure 7:
FIG. 7 is a diagram illustrating the Management Datagram (MAD) base format defined by the InfiniBand Architecture Specification.
Figure 8:
FIG. 8 is a diagram illustrating the Device Management MAD format defined by the InfiniBand Architecture Specification.

The power MADs employed by the embodiments herein are to be implemented in accordance with the IB Architecture Specification (current release 1.3). Details of the IB Management Model are provided in Chapter 13 of IB Architecture Specification Volume 1, while additional details for Subnet Management and Subnet Administration are provided in Chapters 14-16. The MAD base format 700 is shown in FIG. 7, with details of the various fields disclosed in Volume 1, Chapter 13. Bytes 0-2 comprises the Common MAD header format. The Device Management MAD format 800 is shown in FIG. 8. This format is used for device management, which includes management of IB I/O ports and IB devices, such as HCAs. The Device Management MAD format employs the Common MAD header format used by the MAD base format 700 of FIG. 7. Details of the various fields for Device Management MAD format 800 are provided in Volume 1, Chapter 16, section 16.3. As another option, a vendor-specific MAD format may be used, as described in Chapter 16, section 16.5. It is noted that Device Management MAD format 800 also may be configured to support vendor-specific functions.

Generally, one or more management methods may be employed for delivering the power MADs, including device management specific management methods such as DevMgtSet( ), DevMgtTrap( ), and DevMgtReport( ), as well as more general management methods such as Send( ), Trap( ) and Report( ). Responses to MADs delivered using these management methods may be provided, but are not required (except for management methods requiring responses). However, since MADs are delivered using the IB unreliable datagram transport service, it will generally be good practice to at least confirm a MAD has been received. The responses may include use of DevMgtGetResp( ), DevMgtReportResp( ), or otherwise Send( ) or Report( ) may be used for sending responses to received power MADs. The responses may be used for purposes such as to confirm delivery of a MAD and/or confirm that the SMA will perform operations in accordance with a power MAD it has received. Generally, the MADs may be LID (Local ID) routed or Direct routed in accordance with the IB Subnet Management Model specified in Volume 1, Chapter 14.

InfiniBand Architecture Volume 2—Physical Specifications provides details specifying implementation of physical aspects of IB links and interfaces, including details relating to operations of the IB PHYs employed by the embodiments herein. The Link Physical layer provides an interface between the packet byte stream of upper layers and the serial bit stream(s) of the physical media. The physical media may be implemented as 1, 4, or 12 physical lanes. The packet byte stream will be byte striped across the available physical lanes. The byte stream on each physical lane is encoded using the industry standard 8B/10B coding. In addition to encode and decode, the link physical layer includes link training and initialization logic, clock tolerance compensation logic, and receive error detecting logic.

Figure 9:
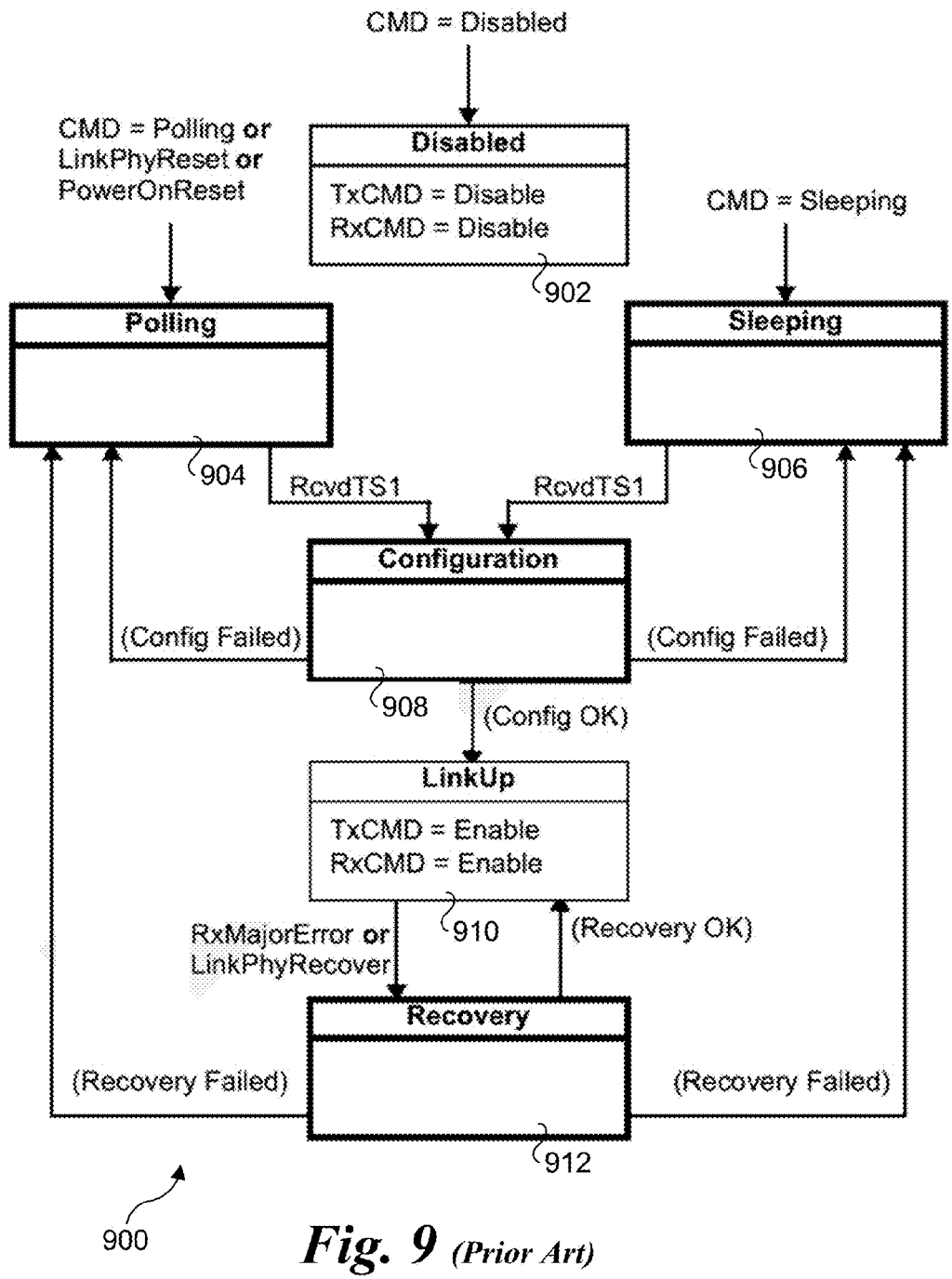
FIG. 9 shows the link training state diagram defined by the InfiniBand Architecture Specification.

A link coupling a pair of IB ports (e.g., an IB port on a switch and an IB port on an HCA) in communication is initialized using a link training sequence. The link training logic in the PHYs of both ports implement a link training state diagram 900 that includes various link states, as shown in FIG. 9. The link states include a disabled state 902, a polling state 904, a sleeping state 906, a configuration state 908, a LinkUp state 910, and a recovery state 912. Each of polling state 904, sleeping state 906, configuration state 908, and recovery state 912 are super states composed of two or more states.

In disabled state 902, the port drives its output to quiescent levels and does not respond to received data. In polling state 904, the port transmits training sequences and responds to received training sequences. This is the default state following power on. In sleeping state 906, the port drives its outputs to quiescent levels and responds to received training sequences. This is a reduced-power state under which the link is kept "alive" to enable the link to be returned to LinkUp state 910, which may be initiated by either of the link ports. Configuration state 908 is a transient super state with both the transmitter and receiver active, and the port is attempting to configure and transition to LinkUp state 910, which is the normal like operation state under which the port is available for transferring packets. Recovery state 912 is entered when a port experiences loss of link synchronization, a major error, or when a link layer error triggers error recovery. In this super state, the port attempts to re-synchronize the link and return it to normal operation.

Changes to port and link states may be initiated by the port on either end of the link using applicable control input MADs. For example, an SM.PortInfo(PortPhysicalState) MAD may be employed to initiate a link training sequence resulting in the PHYs of both ports (and the link itself) to enter a sleeping state. Various other types of control input MADS, as defined in the InfiniBand Architecture Specification, may be used to cause ports and links to enter the link training states illustrated in link training state diagram 900.

In accordance with the principles and teachings disclosed herein, improved power management of InfiniBand switches is provided, resulting in reduced power consumption and cost savings for IB switches configured to implement aspects of the disclosed power-management methods. When multiplied across the large number of IB switches used in a typical data center environment, the aggregated cost savings as a result of power usage reduction is significant.

Further aspects of the subject matter described herein are set out in the following numbered clauses:

Clause 1. An InfiniBand switch, comprising:
a plurality of ports, each port comprising a physical interface (PHY) including an input port coupled to a receive buffer and an output port coupled to an transmit buffer;
memory operatively coupled to the receive buffers and the transmit buffers in the plurality of ports;
packet processing and switch logic including at least one processing element operatively coupled to the memory; and
a subnet management agent, configured to,
receive a power down management datagram (MAD) sent from a first host server having a first InfiniBand Host Channel Adaptor (IB HCA) linked in communication with a first port on the InfiniBand switch, the power down MAD indicating the host server is to transition to a reduced-power state; and
in response to receiving the power down MAD, coordinate a power reduction of the first port.

Clause 2. The InfiniBand switch of clause 1, wherein coordinating a power reduction of the first port comprises:
enabling the PHY of the first port to enter a sleeping state in response an IB link power reduction initiated by the first IB HCA; and
reducing a power level of circuitry other than the PHY dedicated to facilitating operation of the first port.

Clause 3. The InfiniBand switch of clause 1 or 2, wherein the subnet management agent is further configured to track an operating state of the host servers including IB HCAs linked in communication with respective ports on the InfiniBand switch.

Clause 4. The InfiniBand switch of clause 3, wherein the InfiniBand switch includes core switch logic, and wherein the subnet management agent is further configured to:
detect that all servers connected to the InfiniBand switch's ports are operating in a reduced power state or are offline; and
in response thereto, put the core switch logic into a reduced power state.

Clause 5. The InfiniBand switch of clause 4, wherein at least one of the plurality of ports is connected to an upstream InfiniBand switch, and wherein the subnet management agent is further configured to:
send a power down MAD to each upstream InfiniBand switch informing the upstream InfiniBand switch the InfiniBand switch is going to transition to operating in a reduced-power state; and
for each port connected to an upstream InfiniBand switch, cause the port to initiate a link power reduction under which the port's PHY is put into a sleeping state and other circuitry dedicated for operation of the port is put in one of a reduced power state or a sleeping state.

Clause 6. The InfiniBand switch of clause 4, wherein the subnet management agent is further configured to:

while the core switch logic is in a reduced power state, detect at least one of a PHY of one of the plurality of ports has returned to a normal operating state or a port has returned to a normal operating state; and in response to detecting the PHY of a port or a port has returned to its normal operating state, return a power level of the core switch logic to a normal operating state.

Clause 7. The InfiniBand switch of clause 6, wherein at least one of the plurality of ports is connected to an upstream InfiniBand switch, and wherein the subnet management agent is further configured to:

for each port connected to an upstream InfiniBand switch, cause the port to initiate a link power up sequence under which the port's PHY is returned to a normal operating state from a sleeping state and the port is returned to a normal operating state; and send a power up MAD to each upstream InfiniBand switch informing the upstream InfiniBand switch the InfiniBand switch has returned to a normal operating state.

Clause 8. An InfiniBand switch, comprising:

a plurality of multi-port InfiniBand (IB) interfaces, each including multiple ports comprising a physical interface (PHY) including an input port and an output port, each multi-port IB interface further including at least one receive buffer and at least one transmit buffer;

memory operatively coupled to receive buffers and transmit buffers in the plurality of multi-port IB interfaces;

packet processing and switch logic including at least one processing element operatively coupled to the memory; and a subnet management agent, configured to, receive a power down management datagram (MAD) sent from a first host server having a first InfiniBand Host Channel Adaptor (IB HCA) linked in communication with a first port on a first multi-port IB interface, the power down MAD indicating the host server is to transition to a reduced-power state; and in response to receiving the power down MAD, coordinate a power reduction of the first port.

Clause 9. The InfiniBand switch of clause 8, wherein coordinating a power reduction of the first port comprises:

enabling the PHY of the first port to enter a sleeping state in response an IB link power reduction operation initiated by the first IB HCA; and reducing a power level of other circuitry dedicated to facilitating operation of the first port.

Clause 10. The InfiniBand switch of clause 8 or 9, wherein the subnet management agent is further configured to track an operating state of the host servers including IB HCAs linked in communication with respective ports on the plurality of multi-port IB interfaces.

Clause 11. The InfiniBand switch of clause 10, wherein the subnet management agent is further configured to:

track an operating state of each port in a multi-port IB interface that is connected to a IB HCA hosted by a corresponding host server;

detect, for a given multi-port IB interface, that all of the host servers having IB HCAs connected to that multi-port IB interface are operating in a reduced power state or are offline; and in response to detecting that all of the host servers having IB HCAs linked with that multi-port IB interface are operating in a reduced power state or are offline, cause the multi-port IB interface to enter a reduced power state.

Clause 12. The InfiniBand switch of clause 11, wherein the subnet management agent is further configured to:

detect, for a given multi-port IB interface that is operating in a reduced power state, that a PHY of one of the multi-port IB interface's ports has returned to a normal operating state; and in response to detecting the PHY of the port has returned to a normal operating state, cause the multi-port IB interface to return to a normal operating power state.

Clause 13. The InfiniBand switch of any of clauses 8-12, wherein the InfiniBand switch includes core switch logic, and wherein the subnet management agent is further configured to:

detect that all host servers connected to the InfiniBand switch's ports via respective IB HCAs are operating in a reduced power state or are offline; and in response thereto, put the core switch logic into a reduced power state.

Clause 14. The InfiniBand switch of clause 13, wherein at least one of the ports is connected to an upstream InfiniBand switch, and wherein the subnet management agent is further configured to:

send a power down MAD to each upstream InfiniBand switch informing the upstream InfiniBand switch the InfiniBand switch is going to transition to operating in a reduced-power state; and for each port connected to an upstream InfiniBand switch, cause the port to initiate a link power reduction under which the port's PHY is put into a sleeping state and other circuitry dedicated for operation of the port is put in one of a reduced power state or a sleeping state.

Clause 15. The InfiniBand switch of clause 13, wherein the subnet management agent is further configured to:

while the core switch logic is in a reduced power state, detect at least one of a PHY of a port has returned to a normal operating state or a port has returned to a normal operating state; and in response to detecting the PHY of a port or a port has returned to its normal operating state, return a power level of the core switch logic to a normal operating state.

Clause 16. A method performed in a network environment by an InfiniBand switch having a plurality of ports, each of at least a portion of the ports comprising a physical interface (PHY) connected to a respective InfiniBand Host Channel Adaptor (IB HCA) installed in or operatively coupled to a respective host server, the method comprising:

receiving a power down management datagram (MAD) sent from a first host server having a first InfiniBand Host Channel Adaptor (IB HCA) linked in communication with a first port on the InfiniBand switch, the power down MAD indicating the host server is to transition to a reduced-power state; and in response to receiving the power down MAD, coordinating a power reduction of the first port.

Clause 17. The method of clause 16, wherein coordinating a power reduction of the first port comprises:

enabling the PHY of the first port to enter a sleeping state in response to an IB link power reduction initiated by the first IB HCA; and reducing a power level of other circuitry dedicated to facilitating operation of the first port.

Clause 18. The method of clause 16 or 17, further comprising tracking an operating state of each of the host servers.

Clause 19. The method of clause 18, wherein the InfiniBand switch includes core switch logic, the method further comprises:

detecting that all host servers are operating in a reduced power state or are offline; and in response thereto, putting the core switch logic into a reduced power state.

Clause 20. The method of clause 19, wherein at least one of the plurality of ports is connected to an upstream InfiniBand switch, the method further comprising:

sending a power down MAD to each upstream InfiniBand switch informing the upstream InfiniBand switch the InfiniBand switch is going to transition to operating in a reduced-power state; and for each port connected to an upstream InfiniBand switch, causing the port to initiate a link power reduction operation under which the port is put into a reduced power state.

Clause 21. The method of clause 19, further comprising: while the core switch logic is in a reduced power state, detecting at least one of a PHY of one of the plurality of ports has returned to a normal operating state or a port has returned to a normal operating state; and in response to detecting the PHY of a port or a port has returned to its normal operating state, returning a power level of the core switch logic to a normal operating state.

Clause 22. The method of clause 21, wherein at least one of the plurality of ports is connected to an upstream InfiniBand switch, the method further comprising:

for each port connected to an upstream InfiniBand switch, causing the port to initiate a link power up operation under which the port's PHY is returned to a normal operating state from a sleeping state and the port is returned to a normal operating state; and sending a power up MAD to each upstream InfiniBand switch informing the upstream InfiniBand switch the InfiniBand switch has returned to a normal operating state.

Clause 23. A non-transitory machine-readable storage medium, having a plurality of instructions stored thereon and configured to be executed on one or more processing elements in an InfiniBand switch having a plurality of ports, each of at least a portion of the ports comprising a physical interface (PHY) connected to a respective InfiniBand Host Channel Adaptor (IB HCA) installed in or operatively coupled to a respective host server to enable the InfiniBand switch to perform the methods of any of clauses 16-22 when executed.

Clause 24. A method performed in a network environment by an InfiniBand (IB) switch having a plurality of multi-port IB interfaces comprising a plurality of ports, each port comprising a physical interface (PHY), wherein each of at least a portion of the ports are connected to a respective InfiniBand Host Channel Adaptor (IB HCA) installed in or operatively coupled to a respective host server, the method comprising:

receiving a power down management datagram (MAD) sent from a first host server having a first IB HCA linked in communication with a first port on a first multi-port IB interface, the power down MAD indicating the host server is to transition to a reduced-power state; and in response to receiving the power down MAD, coordinating a power reduction of the first port.

Clause 25. The method of clause 24, wherein coordinating a power reduction of the first port comprises:

enabling the PHY of the first port to enter a sleeping state in response an IB link power reduction operation initiated by the first IB HCA; and reducing a power level of other circuitry dedicated to facilitating operation of the first port.

Clause 26. The method of clause 24 or 25, further comprising tracking an operating state for each of the host servers.

Clause 27. The method of any of clauses 24-26, further comprising:

determining, for a given multi-port IB interface, only a single port of the multi-port IB interface is connected to IB HCA of a host server operating in a normal operating state;

receiving a power down MAD from that host server indicating the host server is to transition to a reduced-power state;

detecting that a PHY for the single port as entered a sleeping state or the single port has entered a reduced power state; and causing the multi-port IB interface to enter a reduced power state.

Clause 28. The method of clause 27, further comprising:

detecting, for a given multi-port IB interface that is operating in a reduced power state, that a PHY of one of the multi-port IB interface's ports has returned to a normal operating state; and in response to detecting the PHY of the port has returned to a normal operating state, causing the multi-port IB interface to return to a normal operating power state.

Clause 29. The method of any of clauses 24-27, wherein the InfiniBand switch includes core switch logic, the method further comprising:

detecting that all host servers connected to the InfiniBand switch's ports via respective IB HCAs are operating in a reduced power state or are offline; and in response thereto, put the core switch logic into a reduced power state.

Clause 30. The method of clause 29, wherein at least one of the ports is connected to an upstream InfiniBand switch, the method further comprising:

sending a power down MAD to each upstream InfiniBand switch informing the upstream InfiniBand switch the InfiniBand switch is going to transition to operating in a reduced-power state; and for each port connected to an upstream InfiniBand switch, causing the port to initiate a link power reduction operation under which the port's PHY is put into a sleeping state.

Clause 31. The method of clause 29, further comprising: while the core switch logic is in a reduced power state, detecting at least one of a PHY of a port has returned to a normal operating state or a port has returned to a normal operating state; and in response to detecting the PHY of a port or a port has returned to its normal operating state, returning a power level of the core switch logic to a normal operating state.

Clause 32. A non-transitory machine-readable storage medium, having a plurality of instructions stored thereon and configured to be executed on one or more processing elements in an InfiniBand switch having a plurality of multi-port IB interfaces comprising a plurality of ports, each port comprising a physical interface (PHY), wherein each of at least a portion of the ports are connected to a respective InfiniBand Host Channel Adaptor (IB HCA) installed in or operatively coupled to a respective host server to enable the InfiniBand switch to perform the methods of any of clauses 24-31 when executed.

Clause 32. An InfiniBand switch, comprising:

a plurality of ports, each port comprising a physical interface (PHY) including an input port coupled to a receive buffer and an output port coupled to an transmit buffer;

memory operatively coupled to the receive buffers and the transmit buffers in the plurality of ports; and means for, receiving a power down management datagram (MAD) sent from a first host server having a first InfiniBand Host Channel Adaptor (IB HCA) linked in communication with a first port on the InfiniBand switch, the power down MAD indicating the host server is to transition to a reduced-power state; and in response to receiving the power down MAD, coordinating a power reduction of the first port.

Clause 33. The InfiniBand switch of clause 32, wherein coordinating a power reduction of the first port comprises:

enabling the PHY of the first port to enter a sleeping state in response an IB link power reduction initiated by the first IB HCA; and reducing a power level of other circuitry dedicated to facilitating operation of the first port.

Clause 34. The InfiniBand switch of clause 32 or 33, wherein the InfiniBand switch includes core switch logic, further comprising means for:

tracking an operating state of the host servers including IB HCAs linked in communication with respective ports on the InfiniBand switch;

detecting that all servers connected to the InfiniBand switch's ports are operating in a reduced power state or are offline; and in response thereto, putting the core switch logic into a reduced power state.

Clause 35. The InfiniBand switch of clause 34, wherein at least one of the plurality of ports is connected to an upstream InfiniBand switch, further comprising means for:

sending a power down MAD to each upstream InfiniBand switch informing the upstream InfiniBand switch the InfiniBand switch is going to transition to operating in a reduced-power state; and for each port connected to an upstream InfiniBand switch, causing the port to initiate a link power reduction under which the port's PHY is put into a sleeping state and other circuitry dedicated for operation of the port is put in one of a reduced power state or a sleeping state.

Clause 36. The InfiniBand switch of clause 34, further comprising means for:

while the core switch logic is in a reduced power state, detecting at least one of a PHY of one of the plurality of ports has returned to a normal operating state or a port has returned to a normal operating state; and in response to detecting the PHY of a port or a port has returned to its normal operating state, returning a power level of the core switch logic to a normal operating state.

Clause 37. The InfiniBand switch of clause 36, wherein at least one of the plurality of ports is connected to an upstream InfiniBand switch, further comprising means for:

for each port connected to an upstream InfiniBand switch, causing the port to initiate a link power up sequence under which the port's PHY is returned to a normal operating state from a sleeping state and the port is returned to a normal operating state; and sending a power up MAD to each upstream InfiniBand switch informing the upstream InfiniBand switch the InfiniBand switch has returned to a normal operating state.

Clause 38. An InfiniBand switch, comprising:

a plurality of multi-port InfiniBand (IB) interfaces, each including multiple ports comprising a physical interface (PHY) including an input port and an output port, each multi-port IB interface further including at least one receive buffer and at least one transmit buffer;

memory operatively coupled to receive buffers and transmit buffers in the plurality of multi-port IB interfaces;

packet processing and switch logic including at least one processing element operatively coupled to the memory; and means for, receiving a power down management datagram (MAD) sent from a first host server having a first InfiniBand Host Channel Adaptor (IB HCA) linked in communication with a first port on a first multi-port IB interface, the power down MAD indicating the host server is to transition to a reduced-power state; and in response to receiving the power down MAD, coordinating a power reduction of the first port.

Clause 39. The InfiniBand switch of clause 38, wherein coordinating a power reduction of the first port comprises:

enabling the PHY of the first port to enter a sleeping state in response an IB link power reduction operation initiated by the first IB HCA; and reducing a power level of other circuitry dedicated to facilitating operation of the first port.

Clause 40. The InfiniBand switch of clause 39, further comprising means for:

tracking an operating state of the host servers including IB HCAs linked in communication with respective ports on the plurality of multi-port IB interfaces tracking an operating state of each port in a multi-port IB interface that is connected to a IB HCA hosted by a corresponding host server;

detecting, for a given multi-port IB interface, that all of the host servers having IB HCAs connected to that multi-port IB interface are operating in a reduced power state or are offline; and in response to detecting that all of the host servers having IB HCAs linked with that multi-port IB interface are operating in a reduced power state or are offline, causing the multi-port IB interface to enter a reduced power state.

Clause 41. The InfiniBand switch of clause 40, further comprising means for:

detecting, for a given multi-port IB interface that is operating in a reduced power state, that a PHY of one of the multi-port IB interface's ports has returned to a normal operating state; and in response to detecting the PHY of the port has returned to a normal operating state, causing the multi-port IB interface to return to a normal operating power state.

Clause 42. The InfiniBand switch of any of clauses 38-41, wherein the InfiniBand switch includes core switch logic, further comprising means for:

detecting that all host servers connected to the InfiniBand switch's ports via respective IB HCAs are operating in a reduced power state or are offline; and in response thereto, putting the core switch logic into a reduced power state.

Clause 43. The InfiniBand switch of clause 42, wherein at least one of the ports is connected to an upstream InfiniBand switch, further comprising means for:

sending a power down MAD to each upstream InfiniBand switch informing the upstream InfiniBand switch the InfiniBand switch is going to transition to operating in a reduced-power state; and for each port connected to an upstream InfiniBand switch, causing the port to initiate a link power reduction under which the port's PHY is put into a sleeping state and other circuitry dedicated for operation of the port is put in one of a reduced power state or a sleeping state.

Clause 44. The InfiniBand switch of clause 42, further comprising means for:

while the core switch logic is in a reduced power state, detecting at least one of a PHY of a port has returned to a normal operating state or a port has returned to a normal operating state; and in response to detecting the PHY of a port or a port has returned to its normal operating state, returning a power level of the core switch logic to a normal operating state.

Clause 45. A method performed in a network environment including an InfiniBand switch having a plurality of ports, each of at least a portion of the ports comprising a physical interface (PHY) connected to a respective InfiniBand Host Channel Adaptor (IB HCA) installed in or operatively coupled to a respective host server, the method comprising:

sending a power down management datagram (MAD) from a first host server having a first InfiniBand Host Channel Adaptor (IB HCA) linked in communication with a first port on the InfiniBand switch, the power down MAD indicating the first host server is to transition to a reduced-power state; and entering a reduced power state at the first host server.

Clause 46. The method of clause 45, further comprising:

exiting the reduced power state at the first host server to return the first host server to a normal power operating state; and sending a power up MAD from the first host server to the InfiniBand switch, the power up MAD indicating the first host server will return to or has returned to a normal power operating state.

Clause 47. The method of clause 46, wherein when the first host server is in a reduced power state the IB HCA is put in a reduced power state causing a link between the IB HCA and the InfiniBand switch to enter a sleeping state, the method further comprising:

powering up the first IB HCA;

returning the link from the sleeping state to a normal operating state; and sending the power up MAD over the link after the link has returned to the normal operating state.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Various components referred to above as processes, servers, or tools described herein may be a means for performing the functions described. Each component described herein includes software or hardware, or a combination of these. Each and all components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer or processing elements performing various functions/operations described herein.

As discussed above, various aspects of the embodiments herein may be facilitated by corresponding software and/or firmware components and applications, such as software running on a server or firmware executed by an embedded processor on an IB switch. Thus, embodiments of this invention may be used as or to support a software program, software modules, firmware, and/or distributed software executed upon some form of processing core (such as the CPU of a computer, one or more cores of a multi-core processor), a virtual machine running on a processor or core or otherwise implemented or realized upon or within a non-transitory machine-readable storage medium. A non-transitory computer readable storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable non-transitory storage medium may also include a storage or database from which content can be downloaded. Said non-transitory computer readable medium may also include a device or product having content stored thereon at a time of sale or delivery. Thus, delivering a device with stored content, or offering content for download over a communication medium may be understood as providing an article of manufacture with such content described herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. An InfiniBand switch, comprising:
   a plurality of ports, each port comprising a physical interface (PHY) including an input port coupled to a receive buffer and an output port coupled to a transmit buffer;
   memory operatively coupled to the receive buffers and the transmit buffers in the plurality of ports;
   packet processing and switch logic including at least one processing element operatively coupled to the memory; and
   a subnet management agent, configured to,
      for each of the plurality of ports on the InfiniBand switch,
      receive a power down management datagram (MAD) sent from a respective host server having a respective InfiniBand Host Channel Adaptor (IB HCA) linked in communication with the port, the power down MAD received by the port and indicating the respective host server is to transition to a reduced-power state; and
      in response to receiving the power down MAD, coordinate a power reduction of the port.

2. The InfiniBand switch of claim 1, wherein coordinating a power reduction of each of the ports comprises:
   enabling the PHY of the port to enter a sleeping state in response an IB link power reduction initiated by the first IB HCA; and
   reducing a power level of circuitry other than the PHY dedicated to facilitating operation of the port.

3. The InfiniBand switch of claim 1, wherein the subnet management agent is further configured to track an operating state of the host servers including IB HCAs linked in communication with respective ports on the InfiniBand switch.

4. The InfiniBand switch of claim 3, wherein the InfiniBand switch includes core switch logic, and wherein the subnet management agent is further configured to:
   detect that all host servers connected to the InfiniBand switch's ports are operating in a reduced power state or are offline; and
   in response thereto, put the core switch logic into a reduced power state.

5. The InfiniBand switch of claim 4, wherein at least one of the plurality of ports is connected to an upstream InfiniBand switch, and wherein the subnet management agent is further configured to:
   send a power down MAD to each upstream InfiniBand switch informing the upstream InfiniBand switch the InfiniBand switch is going to transition to operating in a reduced-power state; and
   for each port connected to an upstream InfiniBand switch, cause the port to initiate a link power reduction under which the port's PHY is put into a sleeping state and other circuitry dedicated for operation of the port is put in one of a reduced power state or a sleeping state.

6. The InfiniBand switch of claim 4, wherein the subnet management agent is further configured to:
   while the core switch logic is in a reduced power state, detect at least one of a PHY of one of the plurality of ports has returned to a normal operating state or a port has returned to a normal operating state; and
   in response to detecting the PHY of a port or a port has returned to its normal operating state, return a power level of the core switch logic to a normal operating state.

7. The InfiniBand switch of claim 6, wherein at least one of the plurality of ports is connected to an upstream InfiniBand switch, and wherein the subnet management agent is further configured to:
   for each port connected to an upstream InfiniBand switch, cause the port to initiate a link power up sequence under which the port's PHY is returned to a normal operating state from a sleeping state and the port is returned to a normal operating state; and
   send a power up MAD to each upstream InfiniBand switch informing the upstream InfiniBand switch the InfiniBand switch has returned to a normal operating state.

8. An InfiniBand switch, comprising:
   a plurality of multi-port InfiniBand (IB) interfaces, each including multiple ports comprising a physical interface (PHY) including an input port and an output port, each multi-port IB interface further including at least one receive buffer and at least one transmit buffer;
   memory operatively coupled to receive buffers and transmit buffers in the plurality of multi-port IB interfaces;
   packet processing and switch logic including at least one processing element operatively coupled to the memory; and
   a subnet management agent, configured to,
      receive a power down management datagram (MAD) sent from a first host server having a first InfiniBand Host Channel Adaptor (IB HCA) linked in communication with a first port on a first multi-port IB interface, the power down MAD indicating the host server is to transition to a reduced-power state; and
      in response to receiving the power down MAD, coordinate a power reduction of the first port.

9. The InfiniBand switch of claim 8, wherein coordinating a power reduction of the first port comprises:
   enabling the PHY of the first port to enter a sleeping state in response an IB link power reduction operation initiated by the first IB HCA; and
   reducing a power level of other circuitry dedicated to facilitating operation of the first port.

10. The InfiniBand switch of claim 8, wherein the subnet management agent is further configured to track an operating state of the host servers including IB HCAs linked in communication with respective ports on the plurality of multi-port IB interfaces.

11. The InfiniBand switch of claim 10, wherein the subnet management agent is further configured to:
   track an operating state of each port in a multi-port IB interface that is connected to a IB HCA hosted by a corresponding host server;

detect, for a given multi-port IB interface, that all of the host servers having IB HCAs connected to that multi-port IB interface are operating in a reduced power state or are offline; and in response to detecting that all of the host servers having IB HCAs linked with that multi-port IB interface are operating in a reduced power state or are offline, cause the multi-port IB interface to enter a reduced power state.

12. The InfiniBand switch of claim 11, wherein the subnet management agent is further configured to:

detect, for a given multi-port IB interface that is operating in a reduced power state, that a PHY of one of the multi-port IB interface's ports has returned to a normal operating state; and in response to detecting the PHY of the port has returned to a normal operating state, cause the multi-port IB interface to return to a normal operating power state.

13. The InfiniBand switch of claim 8, wherein the InfiniBand switch includes core switch logic, and wherein the subnet management agent is further configured to:

detect that all host servers connected to the InfiniBand switch's ports via respective IB HCAs are operating in a reduced power state or are offline; and in response thereto, put the core switch logic into a reduced power state.

14. The InfiniBand switch of claim 13, wherein at least one of the ports is connected to an upstream InfiniBand switch, and wherein the subnet management agent is further configured to:

send a power down MAD to each upstream InfiniBand switch informing the upstream InfiniBand switch the InfiniBand switch is going to transition to operating in a reduced-power state; and for each port connected to an upstream InfiniBand switch, cause the port to initiate a link power reduction under which the port's PHY is put into a sleeping state and other circuitry dedicated for operation of the port is put in one of a reduced power state or a sleeping state.

15. The InfiniBand switch of claim 13, wherein the subnet management agent is further configured to:

while the core switch logic is in a reduced power state, detect at least one of a PHY of a port has returned to a normal operating state or a port has returned to a normal operating state; and in response to detecting the PHY of a port or a port has returned to its normal operating state, return a power level of the core switch logic to a normal operating state.

16. A method performed in a network environment including an InfiniBand switch having a plurality of ports, each of at least a portion of the ports comprising a physical interface (PHY) connected to a respective InfiniBand Host Channel Adaptor (IB HCA) installed in or operatively coupled to a respective host server, the method comprising:

receiving a first power down management datagram (MAD) sent from a first host server having a first InfiniBand Host Channel Adaptor (IB HCA) linked in communication with a first port on the InfiniBand switch, the first power down MAD received at the first port and indicating the first host server is to transition to a reduced-power state;

in response to receiving the first power down MAD, coordinating a power reduction of the first port;

receiving a second power down management datagram (MAD) sent from a second host server having a second InfiniBand Host Channel Adaptor (IB HCA) linked in communication with a second port on the InfiniBand switch, the power down MAD received at the second port and indicating the second host server is to transition to a reduced-power state; and in response to receiving the second power down MAD, coordinating a power reduction of the second port.

17. The method of claim 16, wherein the InfiniBand switch includes core switch logic, the method further comprises:

tracking an operating state of each of the host servers;

detecting that all host servers are operating in a reduced power state or are offline; and in response thereto, putting the core switch logic into a reduced power state.

18. The method of claim 17, wherein at least one of the plurality of ports is connected to an upstream InfiniBand switch, the method further comprising:

sending a power down MAD to each upstream InfiniBand switch informing the upstream InfiniBand switch the InfiniBand switch is going to transition to operating in a reduced-power state; and for each port connected to an upstream InfiniBand switch, causing the port to initiate a link power reduction operation under which the port is put into a reduced power state.

19. The method of claim 17, further comprising:

while the core switch logic is in a reduced power state, detecting at least one of a PHY of one of the plurality of ports has returned to a normal operating state or a port has returned to a normal operating state; and in response to detecting the PHY of a port or a port has returned to its normal operating state, returning a power level of the core switch logic to a normal operating state.

20. The method of claim 19, wherein at least one of the plurality of ports is connected to an upstream InfiniBand switch, the method further comprising:

for each port connected to an upstream InfiniBand switch, causing the port to initiate a link power up operation under which the port's PHY is returned to a normal operating state from a sleeping state and the port is returned to a normal operating state; and sending a power up MAD to each upstream InfiniBand switch informing the upstream InfiniBand switch the InfiniBand switch has returned to a normal operating state.

21. A method performed in a network environment including an InfiniBand (IB) switch having a plurality of multi-port IB interfaces comprising a plurality of ports, each port comprising a physical interface (PHY), wherein each of at least a portion of the ports are connected to a respective InfiniBand Host Channel Adaptor (IB HCA) installed in or operatively coupled to a respective host server, the method comprising:

receiving a power down management datagram (MAD) sent from a first host server having a first IB HCA linked in communication with a first port on a first multi-port IB interface, the power down MAD indicating the host server is to transition to a reduced-power state; and in response to receiving the power down MAD, coordinating a power reduction of the first port.

22. The method of claim 21, further comprising:

determining, for a given multi-port IB interface, only a single port of the multi-port IB interface is connected to IB HCA of a host server operating in a normal operating state;

receiving a power down MAD from that host server indicating the host server is to transition to a reduced-power state;

detecting that a PHY for the single port as entered a sleeping state or the single port has entered a reduced power state; and causing the multi-port IB interface to enter a reduced power state.

23. The method of claim 22, further comprising:

detecting, for a given multi-port IB interface that is operating in a reduced power state, that a PHY of one of the multi-port IB interface's ports has returned to a normal operating state; and in response to detecting the PHY of the port has returned to a normal operating state, causing the multi-port IB interface to return to a normal operating power state.

24. The method of claim 22, wherein the InfiniB and switch includes core switch logic, the method further comprising:

detecting that all host servers connected to the InfiniBand switch's ports via respective IB HCAs are operating in a reduced power state or are offline; and in response thereto, put the core switch logic into a reduced power state.

25. The method of claim 24, further comprising:

while the core switch logic is in a reduced power state, detecting at least one of a PHY of a port has returned to a normal operating state or a port has returned to a normal operating state; and in response to detecting the PHY of a port or a port has returned to its normal operating state, returning a power level of the core switch logic to a normal operating state.

* * * * *